US012640954B2

(12) United States Patent
　　Khan et al.

(10) Patent No.:　US 12,640,954 B2
(45) Date of Patent:　May 26, 2026

(54) CONTROLLER-BASED MULTICAST INTERWORKING

(71) Applicant: Cisco Technology, Inc., San Jose, CA (US)

(72) Inventors: Atahar Khan, Bangalore (IN); Vinay Saini, Karnatka (IN); Ankush Ganpatrai Arora, Mumbai (IN); Ganesh Ramalingam Chelliah, Westmead (AU)

(73) Assignee: Cisco Technology, Inc., San Jose, CA (US)

( * ) Notice: Subject to any disclaimer, the term of this patent is extended or adjusted under 35 U.S.C. 154(b) by 347 days.

(21) Appl. No.: 18/231,195

(22) Filed: Aug. 7, 2023

(65) Prior Publication Data

US 2025/0055721 A1　　Feb. 13, 2025

(51) Int. Cl.
　　H04L 12/18　　　(2006.01)
　　H04L 45/02　　　(2022.01)
(52) U.S. Cl.
　　CPC .......... H04L 12/1886 (2013.01); H04L 45/04 (2013.01)
(58) Field of Classification Search
　　CPC ............................. H04L 12/1886; H04L 45/04
　　See application file for complete search history.

(56) References Cited

U.S. PATENT DOCUMENTS

| | | | | |
|---|---|---|---|---|
| 6,526,054 B1 * | 2/2003 | Li | .......................... | H04L 45/48 |
| | | | | 370/395.5 |
| 9,948,472 B2 * | 4/2018 | Drake | ..................... | H04L 12/18 |

| | | | | |
|---|---|---|---|---|
| 10,958,564 B1 * | 3/2021 | Asthana | .................. | H04L 45/20 |
| 2007/0091891 A1 * | 4/2007 | Zwiebel | .................. | H04L 45/16 |
| | | | | 370/432 |
| 2007/0280140 A1 * | 12/2007 | Venketesan | ............. | H04L 45/04 |
| | | | | 370/254 |
| 2010/0049860 A1 | 2/2010 | Kouvelas et al. | | |
| 2011/0305239 A1 * | 12/2011 | Chandrashekharachar | | |
| | | | Suvarneshwar | ........ H04L 45/16 |
| | | | | 370/390 |
| 2013/0064245 A1 * | 3/2013 | Wei | .......................... | H04L 45/22 |
| | | | | 370/390 |
| 2013/0343384 A1 * | 12/2013 | Shepherd | ................ | H04L 45/16 |
| | | | | 370/390 |
| 2014/0086243 A1 * | 3/2014 | Shepherd | ................ | H04L 45/16 |
| | | | | 370/390 |

(Continued)

OTHER PUBLICATIONS

NE500E V800R022C00SPC500 Configuration Guide Huawei Nov. 26, 2022.

*Primary Examiner* — Melanie Jagannathan
(74) *Attorney, Agent, or Firm* — Lee & Hayes, P.C.

(57)　　　　　ABSTRACT

With a controller coupled to a first multicast domain and a second multicast domain having incompatible multicast profiles, source and group (S,G) state information may be extracted from a plurality of nodes of the first multicast domain and the second multicast domain, A first interdomain border node may be within the first multicast domain. A second interdomain border node may be defined within the second multicast domain. The (S,G) state information may be transmitted to the first interdomain border node and the second interdomain border node. The multicast traffic may be transmitted between the first multicast domain and the second multicast domain via the first interdomain border node and the second interdomain border node based at least in part on the (S,G) state information.

17 Claims, 11 Drawing Sheets

(56) References Cited

U.S. PATENT DOCUMENTS

| | | | |
|---|---|---|---|
| 2014/0211615 A1 | 7/2014 | Murphy et al. | |
| 2015/0288540 A1* | 10/2015 | Kotalwar | H04L 61/5069 |
| | | | 370/254 |
| 2018/0367451 A1* | 12/2018 | Gulrajani | H04L 45/54 |
| 2019/0014033 A1* | 1/2019 | Keesara | H04L 45/28 |
| 2020/0092122 A1* | 3/2020 | Mishra | H04L 12/1859 |
| 2020/0106628 A1* | 4/2020 | Nainar | H04L 12/185 |
| 2020/0177503 A1* | 6/2020 | Hooda | H04L 12/4641 |
| 2020/0280455 A1* | 9/2020 | Mishra | H04L 45/16 |
| 2021/0112020 A1* | 4/2021 | Radhakrishnan | H04L 12/66 |
| 2021/0144019 A1* | 5/2021 | Kebler | H04L 12/185 |
| 2021/0281515 A1* | 9/2021 | Basavaraj | H04L 12/185 |
| 2021/0336870 A1 | 10/2021 | Zhao et al. | |
| 2022/0166639 A1 | 5/2022 | Lindem, III et al. | |
| 2022/0345326 A1* | 10/2022 | Nandy | H04L 12/1863 |
| 2022/0417059 A1* | 12/2022 | Nalagatla | H04L 12/185 |
| 2024/0223396 A1* | 7/2024 | Raj | H04L 12/1836 |

* cited by examiner

500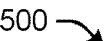

EXTRACT FROM A
PLURALITY OF NODES OF A
FIRST MULTICAST DOMAIN
AND A SECOND MULTICAST
DOMAIN SOURCE AND
GROUP (S,G) DATA
502

DEFINE A FIRST
INTERDOMAIN BORDER
NODE WITHIN THE FIRST
MULTICAST DOMAIN
504

DEFINE A SECOND
INTERDOMAIN BORDER
NODE WITHIN THE SECOND
MULTICAST DOMAIN
506

TRANSMIT THE (S,G) DATA
TO THE FIRST INTERDOMAIN
BORDER NODE AND THE
SECOND INTERDOMAIN
BORDER NODE
508

TRANSMIT MULTICAST
TRAFFIC BETWEEN THE
FIRST MULTICAST DOMAIN
AND THE SECOND
MULTICAST DOMAIN VIA THE
FIRST INTERDOMAIN
BORDER NODE AND THE
SECOND INTERDOMAIN
BORDER NODE BASED AT
LEAST IN PART ON THE
(S,G) DATA
510

FIG. 5

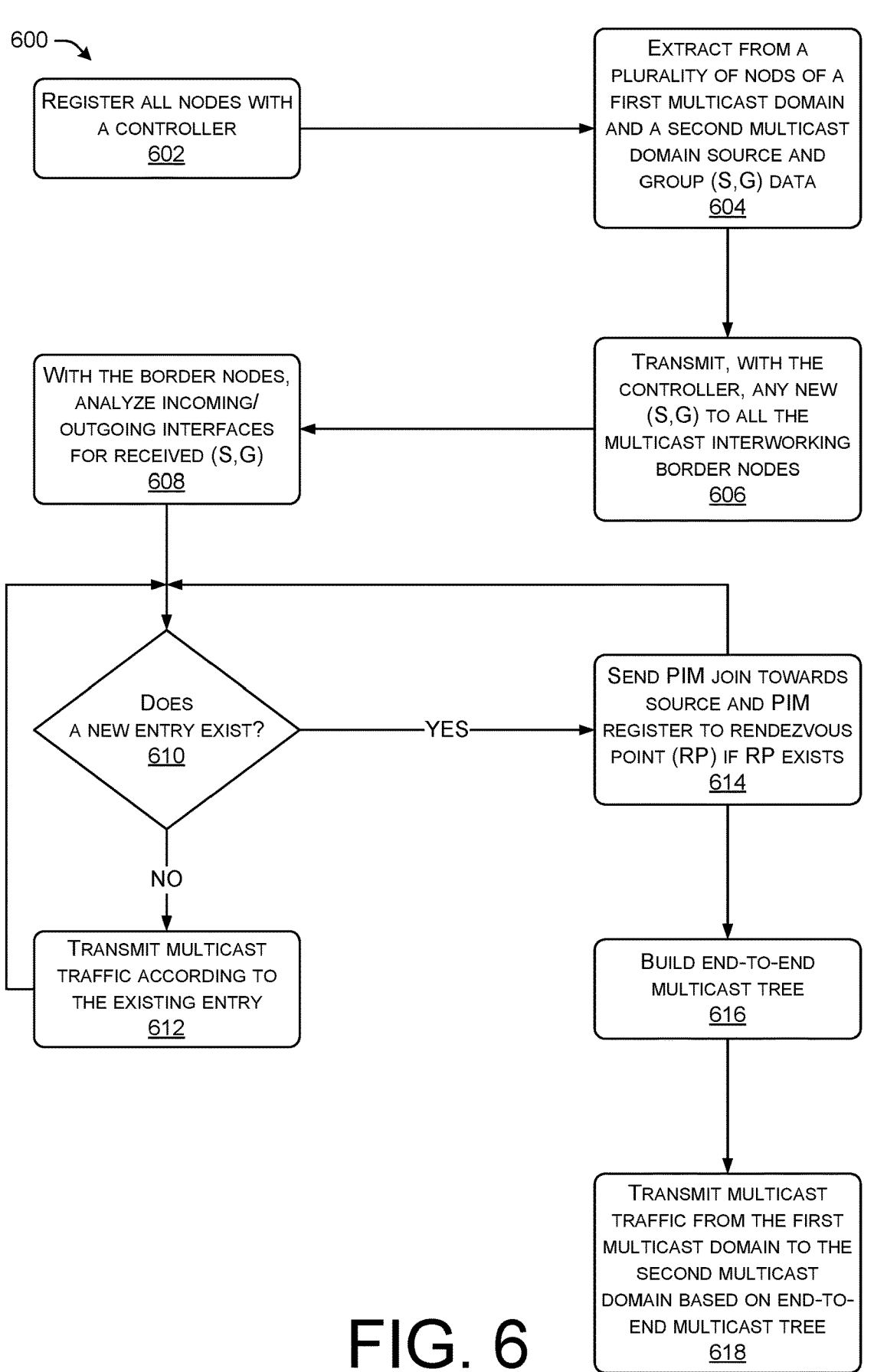

600

REGISTER ALL NODES WITH A CONTROLLER
602

EXTRACT FROM A PLURALITY OF NODS OF A FIRST MULTICAST DOMAIN AND A SECOND MULTICAST DOMAIN SOURCE AND GROUP (S,G) DATA
604

WITH THE BORDER NODES, ANALYZE INCOMING/ OUTGOING INTERFACES FOR RECEIVED (S,G)
608

TRANSMIT, WITH THE CONTROLLER, ANY NEW (S,G) TO ALL THE MULTICAST INTERWORKING BORDER NODES
606

DOES A NEW ENTRY EXIST?
610

——YES——

SEND PIM JOIN TOWARDS SOURCE AND PIM REGISTER TO RENDEZVOUS POINT (RP) IF RP EXISTS
614

NO

TRANSMIT MULTICAST TRAFFIC ACCORDING TO THE EXISTING ENTRY
612

BUILD END-TO-END MULTICAST TREE
616

TRANSMIT MULTICAST TRAFFIC FROM THE FIRST MULTICAST DOMAIN TO THE SECOND MULTICAST DOMAIN BASED ON END-TO-END MULTICAST TREE
618

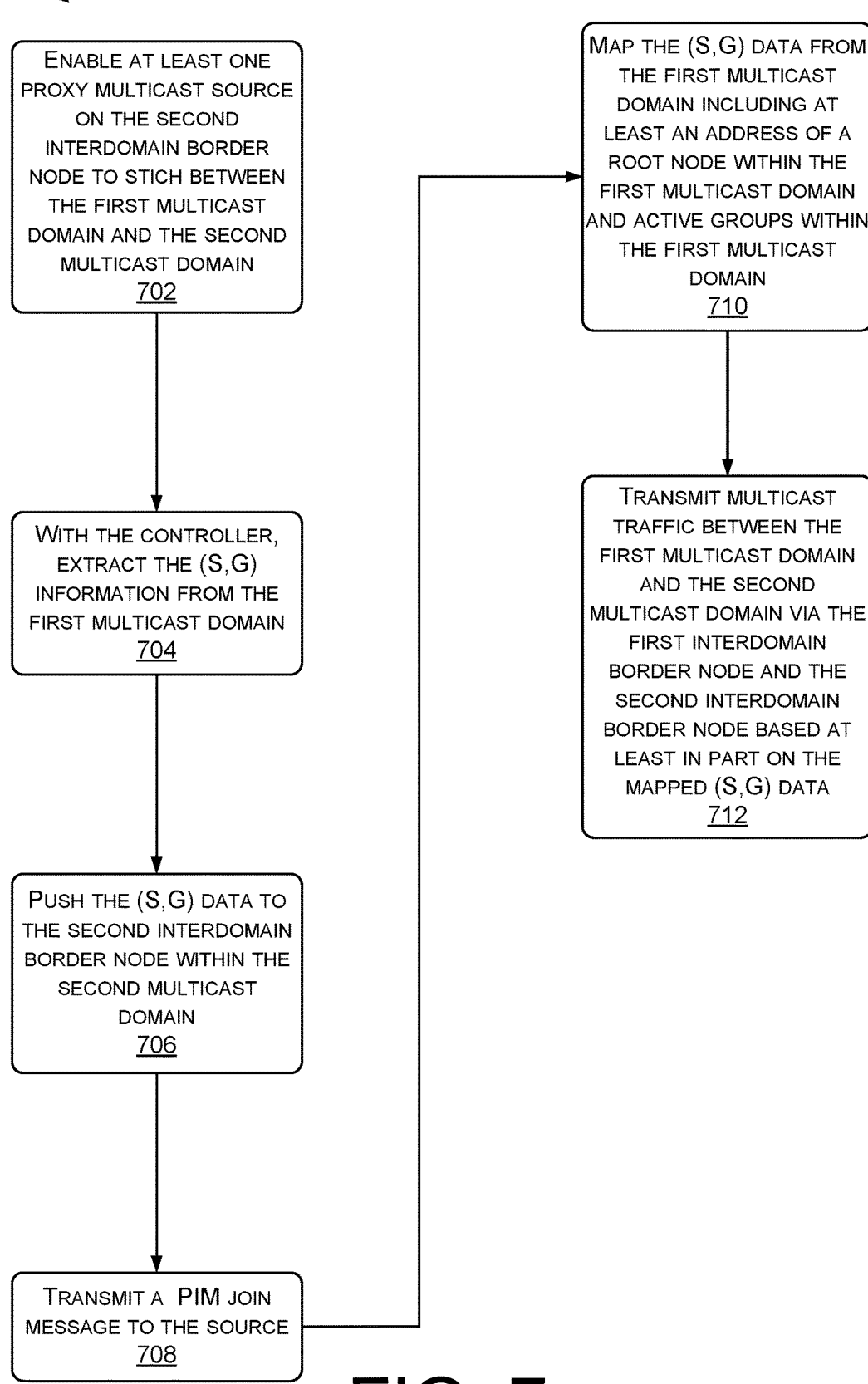

ENABLE AT LEAST ONE
PROXY MULTICAST SOURCE
ON THE SECOND
INTERDOMAIN BORDER
NODE TO STICH BETWEEN
THE FIRST MULTICAST
DOMAIN AND THE SECOND
MULTICAST DOMAIN
702

WITH THE CONTROLLER,
EXTRACT THE (S,G)
INFORMATION FROM THE
FIRST MULTICAST DOMAIN
704

PUSH THE (S,G) DATA TO
THE SECOND INTERDOMAIN
BORDER NODE WITHIN THE
SECOND MULTICAST
DOMAIN
706

TRANSMIT A PIM JOIN
MESSAGE TO THE SOURCE
708

MAP THE (S,G) DATA FROM
THE FIRST MULTICAST
DOMAIN INCLUDING AT
LEAST AN ADDRESS OF A
ROOT NODE WITHIN THE
FIRST MULTICAST DOMAIN
AND ACTIVE GROUPS WITHIN
THE FIRST MULTICAST
DOMAIN
710

TRANSMIT MULTICAST
TRAFFIC BETWEEN THE
FIRST MULTICAST DOMAIN
AND THE SECOND
MULTICAST DOMAIN VIA THE
FIRST INTERDOMAIN
BORDER NODE AND THE
SECOND INTERDOMAIN
BORDER NODE BASED AT
LEAST IN PART ON THE
MAPPED (S,G) DATA
712

FIG. 7

CONTROLLER-BASED MULTICAST INTERWORKING

TECHNICAL FIELD

The present disclosure relates generally to computer networking. Specifically, the present disclosure relates to systems and methods for interdomain multicast interworking between multicast networks with different multicast profiles.

BACKGROUND

Internet Protocol (IP) multicast is a bandwidth-conserving technology that reduces traffic by delivering a single stream of information simultaneously to potentially thousands of nodes within a network or domain. Applications that take advantage of multicast include video conferencing, corporate communications, distance learning, and distribution of software, stock quotes, and news, among a myriad of other applications.

In some instances, a plurality of networks seeking interdomain multicasting options may be utilizing incompatible multicast profiles such as protocol independent multicast (PIM) dense mode (DM), PIM sparse mode (SM), multicast label distribution protocol (mLDP), tree segment identifier (Tree-SID), or other multicast profiles. For example, a first network may utilize PIM-DM or PIM-SM and a second network may be utilizing mLDP or TreeSID in order for the second network to scale and be effectively managed by a controller. However, there is no interworking mechanism that effectively allows for this first and second network to interwork given their incompatible network profiles. This incompatibility of network domains leads to complex network design or isolated multicast network islands. Therefore, the inability of achieving interworking between network domains within different multicast routing protocols is an issue that needs to be resolved in order to provide interdomain multicast interworking.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 5 illustrates a flow diagram of an example method for interdomain multicast traffic transmission, according to an example of the principles described herein.

FIG. 6 illustrates a flow diagram of an example method for interdomain multicast traffic transmission, according to an example of the principles described herein.

FIG. 7 illustrates a flow diagram of an example method for interdomain multicast traffic transmission between a first interdomain border node of a legacy network domain and a second interdomain border node of a Tree-SID network domain, according to an example of the principles described herein.

DESCRIPTION OF EXAMPLE EMBODIMENTS

Overview

Figure 1:
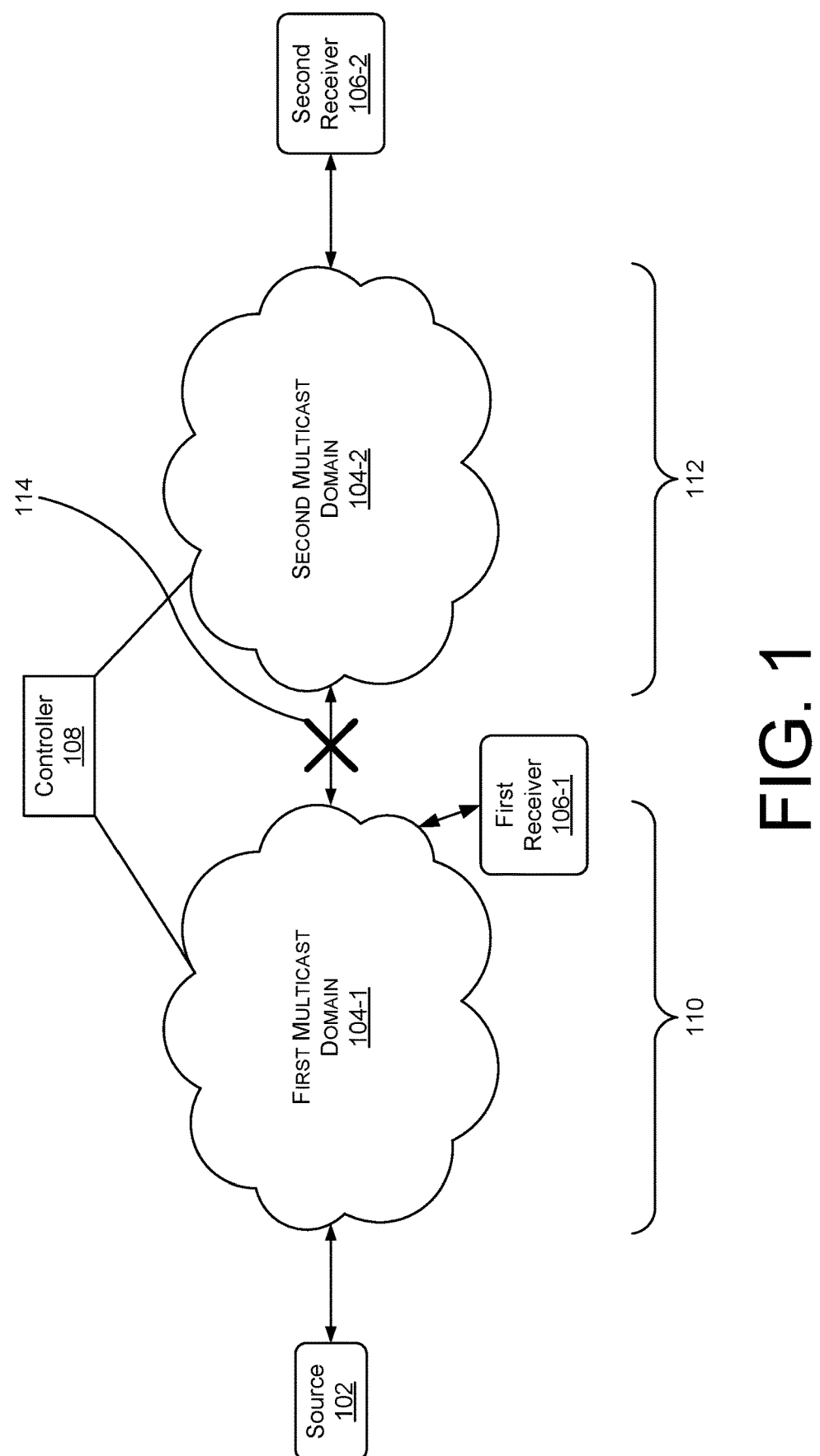
FIG. 1 illustrates a system-architecture diagram of a network including two multicast domains with different multicast profiles that utilize a controller to create interdomain multicast interworking between the multicast domains, according to an example of the principles described herein.

This disclosure describes techniques for interdomain multicast interworking between multicast networks with different multicast profiles. A method to perform the techniques described herein includes, with a controller coupled to a first multicast domain and a second multicast domain having incompatible multicast profiles, extracting from a plurality of nodes of the first multicast domain and the second multicast domain, source and group (S,G) state information. The method may further include defining a first interdomain border node within the first multicast domain and defining a second interdomain border node within the second multicast domain. The method may further include transmitting the (S,G) state information to the first interdomain border node and the second interdomain border node, and transmitting multicast traffic between the first multicast domain and the second multicast domain via the first interdomain border node and the second interdomain border node based at least in part on the (S,G) state information.

Additionally, the techniques described in this disclosure may be performed as a method and/or by a system or device having non-transitory computer-readable media storing computer-executable instructions that, when executed by one or more processors, performs the techniques described above.

Example Embodiments

This disclosure describes systems, methods, and non-transitory computer-readable medium utilized to provide interworking between multicast domains that have different multicast profiles. Many organizations including private a public organizations may have within their telecommunications network(s) a variety of types of networks or domains. The domains within the network(s) of the organization, however, may utilize different multicast profiles. In one example, a first of at least two domains may include a brownfield multicast domain 110 and a second domain with which an administrator seeks to communicate with via the first domain may be a greenfield multicast domain 112. As used in the present specification and in the appended claims, the term "brownfield multicast domain" is meant to be understood broadly as any multicast domain that utilizes existing and/or legacy devices, configurations, software, and/or protocols. Further, as used in the present specification and in the appended claims, the term "greenfield multicast domain" is meant to be understood broadly as any multicast domain that utilizes relatively newly-developed devices, configurations, software, and/or protocols. A brownfield multicast domain 110 that utilizes a first type of protocol may need to communicate with a greenfield multicast domain 112 that utilizes a second type of protocol that is incompatible with those of the brownfield multicast domain 110. The first multicast domain (e.g., the brownfield multicast domain 110) may run, for example, protocol independent multicast (PIM) dense mode (DM), PIM sparse mode (SM) multicast profiles and the second multicast domain (e.g., the greenfield multicast domain 112) may run, for example, multicast label distribution protocol (mLDP), tree segment identifier (Tree-SID), or other relatively newly-developed that allow for scaling and which may be effectively managed by a controller. There is no interworking mechanism between the first multicast domain and the second multicast domain, and this incompatibility may lead to complex network design or isolated multicast islands.

FIG. 1 illustrates a system-architecture diagram of two multicast domains with different multicast profiles and may be useful in describing a number of brownfield and greenfield scenarios. As indicated by 114, an incompatibility may exist between the first multicast domain 104-1 which may include, for example, a PIM-DM-based multicast domain, and the second multicast domain 104-2 which may include, for example, a PIM-SM-based multicast domain. A source in communication with the first multicast domain 104-1 may seek to communicate with or otherwise transmit data packets to a second receiver 106-2 in communication with the second multicast domain 104-2. Although a first receiver 106-1 may be able to receive communications from the source 102 given its direct connection to the first multicast domain 104-1, the second receiver 106-2 may not be able to due to the above-described lack of interworking between the first multicast domain 104-1 and the second multicast domain 104-2.

PIM is a collection of multicast routing protocols, each optimized for a different environment and include PIM-DM and PIM-SM. PIM-DM is a multicast routing protocol designed with an opposite assumption to PIM-SM: namely, that the receivers for any multicast group are distributed densely throughout the network, and that it is assumed that most (or at least many) subnets in the network will want any given multicast packet. Multicast data is initially sent to all hosts in the network. Routers that do not have any interested hosts then send PIM Prune messages to remove themselves from the tree. When the source 102 first starts sending data, each router on the source's LAN receives the data and forwards it to all its PIM neighbors and to all links with directly attached receivers for the data, and each router that receives a forwarded packet also forwards it likewise, but only after checking that the packet arrived on its upstream interface. If not, the packet is dropped. This mechanism prevents forwarding loops from occurring. In this way, the data is flooded to all parts of the network.

PIM-SM, in contrast, is designed based on the assumption that recipients for any particular multicast group are sparsely distributed throughout a network, and that most subnets in the network will not want any given multicast packet. In order to receive multicast data in PIM-SM network, routers explicitly tell their upstream neighbors about their interest in particular groups and sources. Under this protocol, the routers use PIM Join and Prune messages to join and leave multicast distribution trees. PIM-SM may use shared trees, which are multicast distribution trees rooted at a selected node referred to as the rendezvous point (RP) and may be used by all sources sending to the multicast group. An RP is required only in networks running PIM-SM where only network segments with active receivers that have explicitly requested multicast data will be forwarded the traffic. This method of delivering multicast data is in contrast to the PIM-DM model where multicast traffic is initially flooded to all segments of the network. In PIM-SM, routers that have no downstream neighbors or directly connected receivers prune back the unwanted traffic. An RP acts as the meeting place for sources and receivers of multicast data. In a PIM-SM network, sources must send their traffic to the RP. This traffic is then forwarded to receivers down a shared distribution tree, and the receivers must register with the RP in order to receive the multicast traffic from the RP. By default, when the first hop router of the receiver learns about the source, it will send a join message directly to the source 102, creating a source-based distribution tree from the source 102 to the first receiver 106-1 and/or the second receiver 106-2. This source tree does not include the RP unless the RP is located within the shortest path between the source and receiver. The source 102 may encapsulate data in PIM control messages and send it by unicast to the RP. In contrast to PIM-SM, PIM-DM only uses source-based trees. As a result, it does not use RPs, which makes it simpler than PIM-SM to implement and deploy.

Thus, in this first scenario where the first multicast domain 104-1 utilizes PIM-DM and the second multicast domain 104-2 utilizes PIM-SM, there may arise a need to migrate PIM-DM-based multicast network to a PIM-SM-based network but there is no solution to interwork between the profile or to switch two multicast flows in use cases such as, for example, closed circuit television (CCTV) camera networks or airport radio station networks. PIM-DM to PIM-SM interworking is not available when the source is placed in PIM-DM and receivers are present in both the brownfield multicast network 110 (e.g., the first multicast domain 104-1) and greenfield multicast networks 112 (e.g., the second multicast domain 104-2).

In a second scenario, the first multicast domain 104-1 may include a PIM-DM-based multicast network or a PIM-SM-based multicast network and the second multicast domain 104-2 may include an mLDP-based multicast network. An entity may be seeking to obtain a seamless option to migrate from the PIM-DM-based or PIM-SM-based multicast network to the mLDP-based multicast network, but interworking is a challenge at an intermediate stage. Label distribution protocol (LDP) is a set of procedures by which label switching routers (LSRs) distribute labels to support multiprotocol label switching (MPLS) forwarding of unicast traffic along routing paths set by an IP unicast routing protocol. Label switched paths (LSPs) are established to carry traffic that is identified by its forwarding equivalence class (FEC). Extensions to LDP for the setup of point-to-multipoint (P2MP) and multipoint-to-multipoint (MP2MP) LSPs in MPLS networks are referred to as mLDP. In one example, the mLDP-based multicast network of the second multicast domain 104-2 may include an mLDP, profile 14 multicast network. In this second scenario, because the PIM-DM-based or PIM-SM-based multicast network (e.g., the first multicast domain 104-1) is an IP routing network and the mLDP-based multicast network (e.g., the second multicast domain 104-2) is an MPLS-enabled network, it may be difficult and may take significant time and resources to enable interworking between the first multicast domain 104-1 and the second multicast domain 104-2.

In a third scenario, the first multicast domain 104-1 may include a PIM-DM-based multicast network or a PIM-SM-based multicast network and the second multicast domain 104-2 may include a Tree-SID-based multicast network. An entity may be seeking to obtain a seamless option to migrate from the PIM-DM-based, PIM-SM-based, or mLDP-based multicast network to the Tree-SID-based multicast network, but interworking is a challenge in this third scenario as well. Tree-SID is a tree-building solution that uses a segment routing path computation element (SR-PCE) using path computation element protocol (PCEP) to calculate the point-to-multipoint (P2MP) tree using segment routing (SR) policies. Tree-SID uses a single MPLS label for building a multicast replication tree in an SR network. Tree-SID does not require multicast control protocols such as RSVP, mLDP, and PIM. A P2MP SR policy provides an SR-based traffic engineering (TE) solution for transporting multicast traffic, works on existing data-plane (MPLS and IP), and supports TE capabilities and single/multirouting domains. At each node of the tree, the forwarding state may be represented by the same segment (e.g., using a global Tree-SID specified from the segment routing local block (SRLB) range of labels). P2MP SR policy prevents transient loop and packet loss when updating the path of a P2MP SR policy. A P2MP SR policy request may include the following: policy name, SID for the P2MP Tree (e.g., the Tree-SID), an address of the root node, addresses of the leaf nodes, optimization objectives (TE, interior gateway protocol (IGP), delay metrics, etc.), and constraints (affinity). The present systems and methods also include active groups mapped from PIM-DM/SM/mLDP.

Thus, in an SR-MPLS-based network such as the example Tree-SID-based multicast network (e.g., the second multicast domain 104-2), a unifying service architecture and reduced protocol stack may be required for the Ultra Service Platform (USP) developed and distributed by Cisco Systems, Inc. The Tree-SID-based multicast network (e.g., the second multicast domain 104-2) may include an SR-PCE controller that communicates with the Tree-SID-based multicast network (e.g., the second multicast domain 104-2) using border gateway protocol link-state (BGP-LS). BGP-LS is an Address Family Identifier (AFI) and Sub-address Family Identifier (SAFI) defined to carry IGP link-state database through BGP routing protocol and delivers network topology information to topology servers and Application Layer Traffic Optimization (ALTO) servers. An SR-PCE controller-based multicast solution like Tree-SID eliminates the need of PIM or mLDP, and, therefore, does not provide for the interworking between the first multicast domain 104-1 and the second multicast domain 104-2 in this third scenario.

As indicated in the above scenarios and in other scenarios that may be considered iterations or permutations thereof, the inability of creating interworking within different protocol islands of multicast domains is an issue that should be resolved in order to allow for less complex network designs, eliminate the isolated multicast islands, and seamless interworking between multicast domains running different profiles or protocols to meet additional and/or new service demands.

Examples described herein provide a non-transitory computer-readable medium storing instructions that, when executed, causes a processor to perform operations. The operations may include, with a controller coupled to a first multicast domain and a second multicast domain having incompatible multicast profiles, extracting from a plurality of nodes of the first multicast domain and the second multicast domain, source and group (S,G) state information. The operations may also include defining a first interdomain border node within the first multicast domain; and defining a second interdomain border node within the second multicast domain. The operations may also include transmitting the (S,G) state information to the first interdomain border node and the second interdomain border node and transmitting multicast traffic between the first multicast domain and the second multicast domain via the first interdomain border node and the second interdomain border node based at least in part on the (S,G) state information.

The operations may further include registering the plurality of nodes of the first multicast domain and the second multicast domain with the controller. The (S,G) state information may include any data or information extracted from the plurality of nodes via an interdomain address family for communication between the first multicast domain and the second multicast domain, the interdomain address family being based at least in part on a modified border gateway protocol link state (BGP-LS) protocol. The modified BGP-LS protocol may be modified by inclusion of a type, length, value (TLV) tuple.

Transmitting the (S,G) state information to the first interdomain border node and the second interdomain border node may include analyzing incoming and outgoing interfaces for the (S,G) state information and determining if any new (S,G) state information are included in the (S,G) state information. The transmitting may also include, based at least in part on the new (S,G) state information being included in the (S,G) state information, transmitting a protocol-independent multicast (PIM) join message to a source within the first multicast domain. The transmitting may also include, based at least in part on a rendezvous point (RP) existing within the second multicast domain, transmitting a protocol-independent multicast (PIM) register message to an RP in the second multicast domain from the second interdomain border node. The transmitting may further include building and end-to-end multicast tree based on the (S,G) state information and new (S,G) state information and transmitting the multicast traffic between the first multicast domain and the second multicast domain via the first interdomain border node and the second interdomain border node based at least in part on the end-to-end multicast tree.

The operations may further include, based at least in part on no new (S,G) state information being included in the (S,G) state information, transmitting the multicast traffic between the first multicast domain and the second multicast domain based on an existing entry within the (S,G) state information. Transmitting the (S,G) state information to the first interdomain border node and the second interdomain border node is performed at a time interval. A value of the time interval may include a default join/prune timeout value of 210 seconds, or a new value defined to synchronize (S,G) states between the controller and the first interdomain border node and the second interdomain border node, the new value being less than the default join/prune timeout value. Defining the first interdomain border node and defining the second interdomain border node may be performed in a single instance via an interface.

The controller may form part of a tree segment identifier (tree-SID)-based multicast domain. The controller may further perform the operations including enabling at least one proxy multicast source on at least one of the first interdomain border node or the second interdomain border node to stich between the first multicast domain and the second multicast domain, and extracting the (S,G) state information from the first multicast domain. The operations may further include pushing the (S,G) state information to the second interdomain border node within the second multicast domain, and transmitting a PIM join message to a source. The operations may further include mapping the (S,G) state information from the first multicast domain including at least an address of a root node within the first multicast domain and active groups within the first multicast domain and transmitting the multicast traffic between the first multicast domain and the second multicast domain via the first interdomain border node and the second interdomain border node based at least in part on the (S,G) state information.

Examples described herein also provide a system including a processor, and a non-transitory computer-readable media storing instructions that, when executed by the processor, causes the processor to perform operations. The operations may include, with a controller coupled to a first multicast domain and a second multicast domain having incompatible multicast profiles and extracting from a plurality of nodes of the first multicast domain and the second multicast domain, source, and group (S,G) state information. The operations may also include defining a first interdomain border node within the first multicast domain and defining a second interdomain border node within the second multicast domain. The operations may also include transmitting the (S,G) state information to the first interdomain border node and the second interdomain border node and transmitting multicast traffic between the first multicast domain and the second multicast domain via the first interdomain border node and the second interdomain border node based at least in part on the (S,G) state information.

The (S,G) state information is extracted from the plurality of nodes via an interdomain address family for communication between the first multicast domain and the second multicast domain, the interdomain address family being based at least in part on a modified border gateway protocol link state (BGP-LS) protocol modified by inclusion of a type, length, value (TLV) tuple. Transmitting the (S,G) state information to the first interdomain border node and the second interdomain border node may include analyzing incoming and outgoing interfaces for the (S,G) state information and determining if any new (S,G) state information are included in the (S,G) state information. The operations may also include, based at least in part on the new (S,G) state information being included in the (S,G) state information, transmitting, by the second interdomain border node, a protocol-independent multicast (PIM) join message to a source within the first multicast domain. The operations may also include, based at least in part on a rendezvous point (RP) existing within the second multicast domain, transmitting, by the second interdomain border node, a protocol-independent multicast (PIM) register message to the RP in the second multicast domain from the second interdomain border node. The operations may further include building and end-to-end multicast tree based on the (S,G) state information and new (S,G) state information, and transmitting the multicast traffic between the first multicast domain and the second multicast domain via the first interdomain border node and the second interdomain border node based at least in part on the end-to-end multicast tree.

The controller may form part of a tree segment identifier (tree-SID)-based multicast domain. The controller may further perform operations including enabling at least one proxy multicast source on the second interdomain border node to stich between the first multicast domain and the second multicast domain, and extracting the (S,G) state information from the first multicast domain. The operations may further include pushing the (S,G) state information to the second interdomain border node within the second multicast domain, and transmitting a PIM join message to a source. The operations may further include mapping the (S,G) state information from the first multicast domain including at least an address of a root node within the first multicast domain and active groups within the first multicast domain and transmitting the multicast traffic between the first multicast domain and the second multicast domain via the first interdomain border node and the second interdomain border node based at least in part on the (S,G) state information.

Examples described herein also provide a method of interdomain multicast traffic transmission, include, with a controller coupled to a first multicast domain and a second multicast domain having incompatible multicast profiles, and extracting from a plurality of nodes of the first multicast domain and the second multicast domain, source and group (S,G) state information. The method may further include defining a first interdomain border node within the first multicast domain and defining a second interdomain border node within the second multicast domain. The method may further include transmitting the (S,G) state information to the first interdomain border node and the second interdomain border node and transmitting multicast traffic between the first multicast domain and the second multicast domain via the first interdomain border node and the second interdomain border node based at least in part on the (S,G) state information.

The method may further include registering the plurality of nodes of the first multicast domain and the second multicast domain with the controller. The (S,G) state information is extracted from the plurality of nodes via an interdomain address family for communication between the first multicast domain and the second multicast domain, the interdomain address family being based at least in part on a modified border gateway protocol link state (BGP-LS) protocol.

Transmitting the (S,G) state information to the first interdomain border node and the second interdomain border node may include analyzing incoming and outgoing interfaces for the (S,G) state information, and determining if any new (S,G) state information are included in the (S,G) state information. The method may further include based at least in part on the new (S,G) state information being included in the (S,G) state information, transmitting a protocol-independent multicast (PIM) register message to a source within the first multicast domain. The method may further include, based at least in part on a rendezvous point (RP) existing within the second multicast domain, transmitting, by the second interdomain border node, a protocol-independent multicast (PIM) register message to the RP in the second multicast domain from the second interdomain border node, building and end-to-end multicast tree based on the (S,G) state information and new (S,G) state information, and transmitting the multicast traffic between the first multicast domain and the second multicast domain via the first interdomain border node and the second interdomain border node based at least in part on the end-to-end multicast tree. The method may further include, based at least in part on no new (S,G) state information being included in the (S,G) state information, transmitting the multicast traffic between the first multicast domain and the second multicast domain based on an existing entry within the (S,G) state information.

Transmitting the (S,G) state information to the first interdomain border node and the second interdomain border node may be performed at a time interval. A value of the time interval may include a default join/prune timeout value of 210 seconds, or a new value defined to synchronize (S,G) states between the controller and the first interdomain border node and the second interdomain border node, the new value being less than the default join/prune timeout value.

The controller may form part of a tree segment identifier (tree-SID)-based multicast domain. The method may further include enabling at least one proxy multicast source on the second interdomain border node to stich between the first multicast domain and the second multicast domain, extracting the (S,G) state information from the first multicast domain, and pushing the (S,G) state information to the second interdomain border node within the second multicast domain. The method may further include transmitting a PIM join message to a source, mapping the (S,G) state information from the first multicast domain including at least an address of a root node within the first multicast domain and active groups within the first multicast domain, and transmitting the multicast traffic between the first multicast domain and the second multicast domain via the first interdomain border node and the second interdomain border node based at least in part on the (S,G) state information.

This disclosure describes techniques for provisioning interworking between multicast domains executing different and incompatible profiles or protocols. As described herein, a controller coupled to a first multicast domain and a second multicast domain that have incompatible multicast profiles may extract from a plurality of nodes of the first multicast domain and the second multicast domain, source and group (S,G) state information. The controller may define a first interdomain border node within the first multicast domain and define a second interdomain border node within the second multicast domain. The controller may also transmit the (S,G) state information to the first interdomain border node and the second interdomain border node. Multicast traffic may be transmitted between the first multicast domain and the second multicast domain via the first interdomain border node and the second interdomain border node based at least in part on the (S,G) state information.

The techniques described herein provide various improvements and efficiencies with respect to using a controller and the (S,G) state information to allow a source 102 communicatively coupled to a first multicast domain to effectively communicate with a second receiver 106-2 communicatively coupled to a second multicast domain 104-2 despite the differences in profiles and/or protocols used by the first multicast domain 104-1 and the second multicast domain 104-2.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

Turning again to FIG. 1, FIG. 1 illustrates a system-architecture diagram a network 100 including two multicast domains with different multicast profiles that utilize a controller 108 to create interdomain multicast interworking between the multicast domains, according to an example of the principles described herein. As indicate above, the two multicast domains may include a first multicast domain 104-1 and a second multicast domain 104-2 that are unable to communicate due to an incompatibility 114 that may exist between the first multicast domain 104-1 and the second multicast domain 104-2. The above-described scenarios provide examples of such incompatibilities. The first multicast domain 104-1 may be included within or designated as a brownfield multicast domain 110 and may utilize a network protocol that may be described as a legacy protocol. The second multicast domain 104-2 may be included within or designated as a greenfield multicast domain 112 that utilizes a second type of protocol that is incompatible with those of the brownfield multicast domain 110 and may utilize relatively newly-developed devices, configurations, software, and/or protocols.

As mentioned above, a first receiver 106-1 may be communicatively coupled to the first multicast domain 104-1 and the source 102 may efficiently communicate with the first receiver 106-1 since the transmission of data packets through the single domain (e.g., the first multicast domain 104-1) does not create an incompatibility issue. However, the source 102 may have relatively less effective communications with the second receiver 106-2 given the fact that transmission of data packets through two incompatible domains (e.g., both the first multicast domain 104-1 and the second multicast domain 104-2) creates the incompatibility issues described above. The source 102, first receiver 106-1, and/or second receiver 106-2 may include any server computer, workstation, desktop computer, laptop computing device, tablet computing device, network appliance, e-reader, smartphone, or other computing device connected to and/or transmitting or streaming data via the first multicast domain 104-1 and the second multicast domain 104-2.

The controller 108 may similarly include any server computer, workstation, desktop computer, laptop computing device, tablet computing device, network appliance, e-reader, smartphone, or other computing device communicatively coupled to both the first multicast domain 104-1 and the second multicast domain 104-2. The controller 108 serves to eliminate the incompatibilities existing between the first multicast domain 104-1 and the second multicast domain 104-2 and allows for seamless interworking between the first multicast domain 104-1 and the second multicast domain 104-2.

Figure 2:
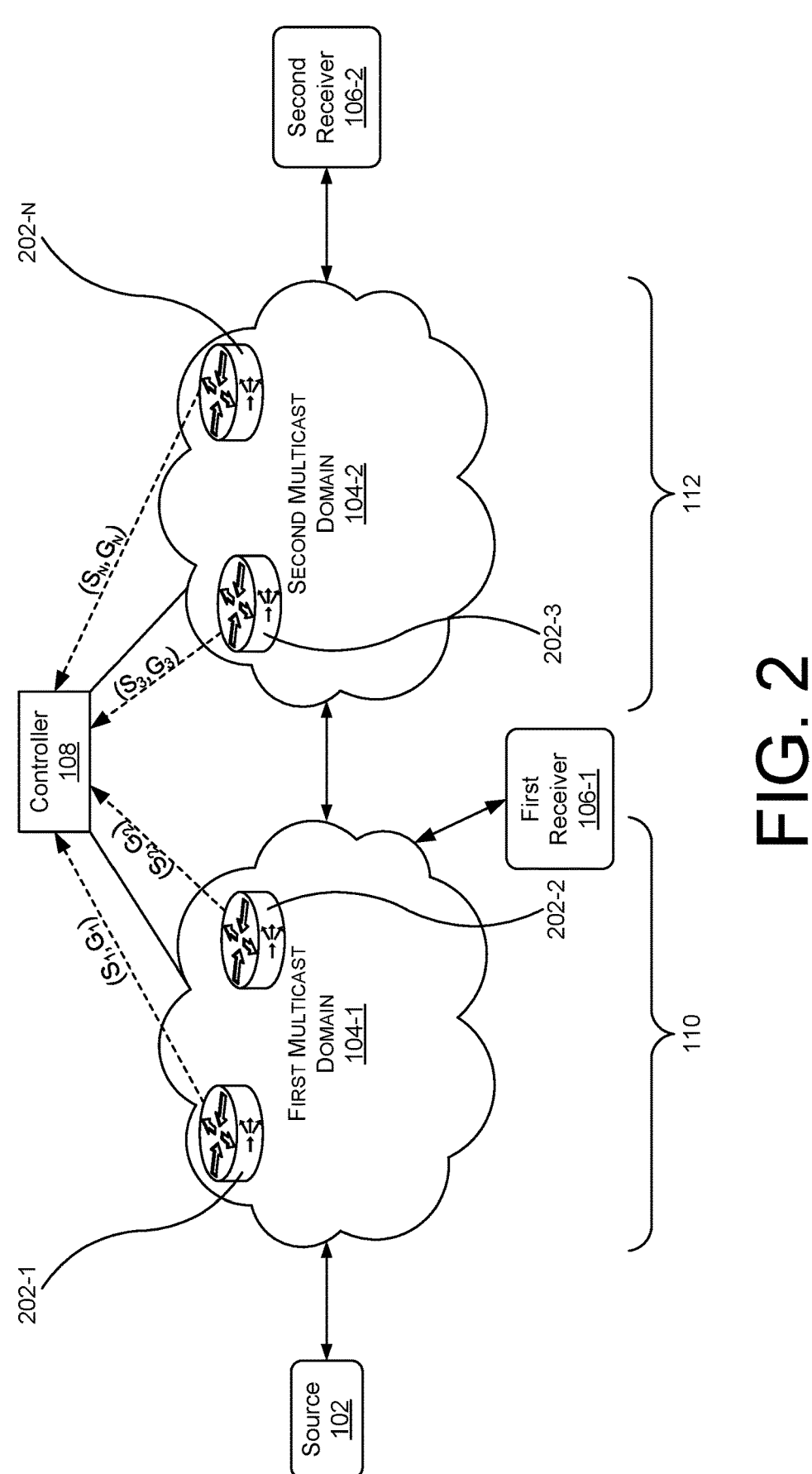
FIG. 2 illustrates the system-architecture diagram of the network of FIG. 1 including a number of nodes, according to an example of the principles described herein.

FIG. 2 illustrates the system-architecture diagram of the network 100 of FIG. 1 including a number of nodes 202-1, 202-2, 202-3, . . . 202-N, where N is any integer greater than or equal to 1 (collectively referred to herein as node(s) 202 unless specifically addressed otherwise) 202, according to an example of the principles described herein. Any number of nodes 202 may be included within the first multicast domain 104-1 and the second multicast domain 104-2. As will be described in more detail herein, the controller 108 may be used to build end-to-end multicast trees with different domains (PIM-SM, PIM source specific node (SSM), PIM-DM, multicast virtual private network (MVPN) generic routing encapsulation (GRE), multicast label distribution protocol (MLDP), etc.). With the controller 108 coupled to the first multicast domain 104-1 and the second multicast domain 104-2, source and group (S,G) state information (e.g., $(S_1,G_1)$, $(S_2,G_2)$, $(S_3,G_3)$, . . . $(S_N,G_N)$ where N is any integer greater than or equal to 1 (collectively referred to herein as (S,G) unless specifically addressed otherwise) may be extracted from the nodes of the first multicast domain 104-1 and the second multicast domain 104-2. Traffic for one (S,G) channel may include datagrams with an IP unicast source address "S" and a multicast group address "G" as the IP destination address. The controller 108 may store the (S,G) state information locally or via a database commutatively coupled to the controller 108.

Figure 3:
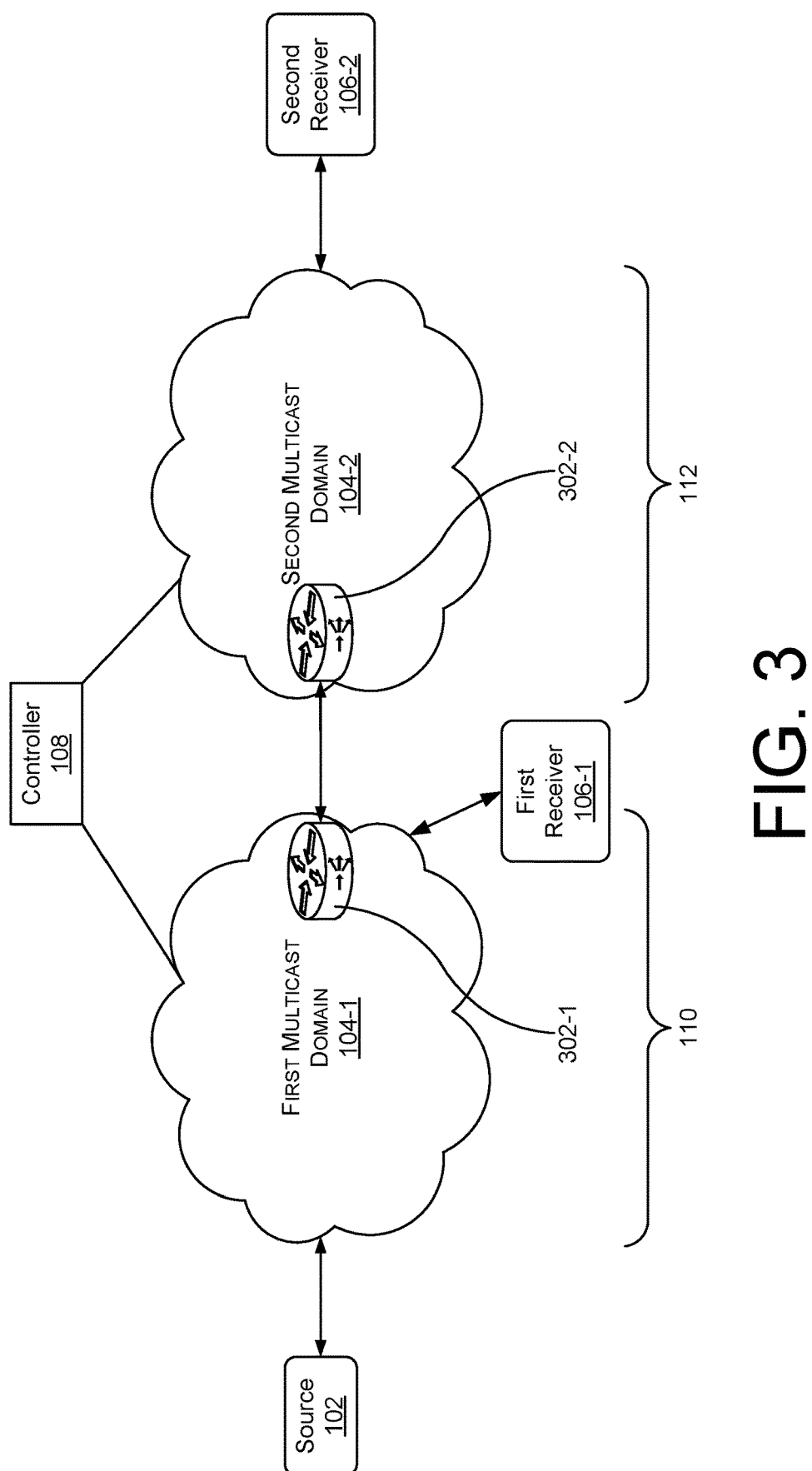
FIG. 3 illustrates the system-architecture diagram of the network of FIG. 1 including a first interdomain border node and a second interdomain border node, according to an example of the principles described herein.

FIG. 3 illustrates the system-architecture diagram of the network of FIG. 1 including a first interdomain border node 302-1 and a second interdomain border node 302-2, according to an example of the principles described herein. The controller 108 may, after receiving the (S,G) state information, define a first interdomain border node 302-1 within the first multicast domain 104-1 and define a second interdomain border node 302-2 within the second multicast domain 104-2. The (S,G) state information may be transmitted by the controller 108 to the first interdomain border node 302-1 and the second interdomain border node 302-2. The controller 108 may transmit multicast traffic between the first multicast domain 104-1 and the second multicast domain 104-2 via the first interdomain border node 302-1 and the second interdomain border node 302-2 and based at least in part on the (S,G) state information provided to the first interdomain border node 302-1 and the second interdomain border node 302-2 from the controller 108.

Figure 4:
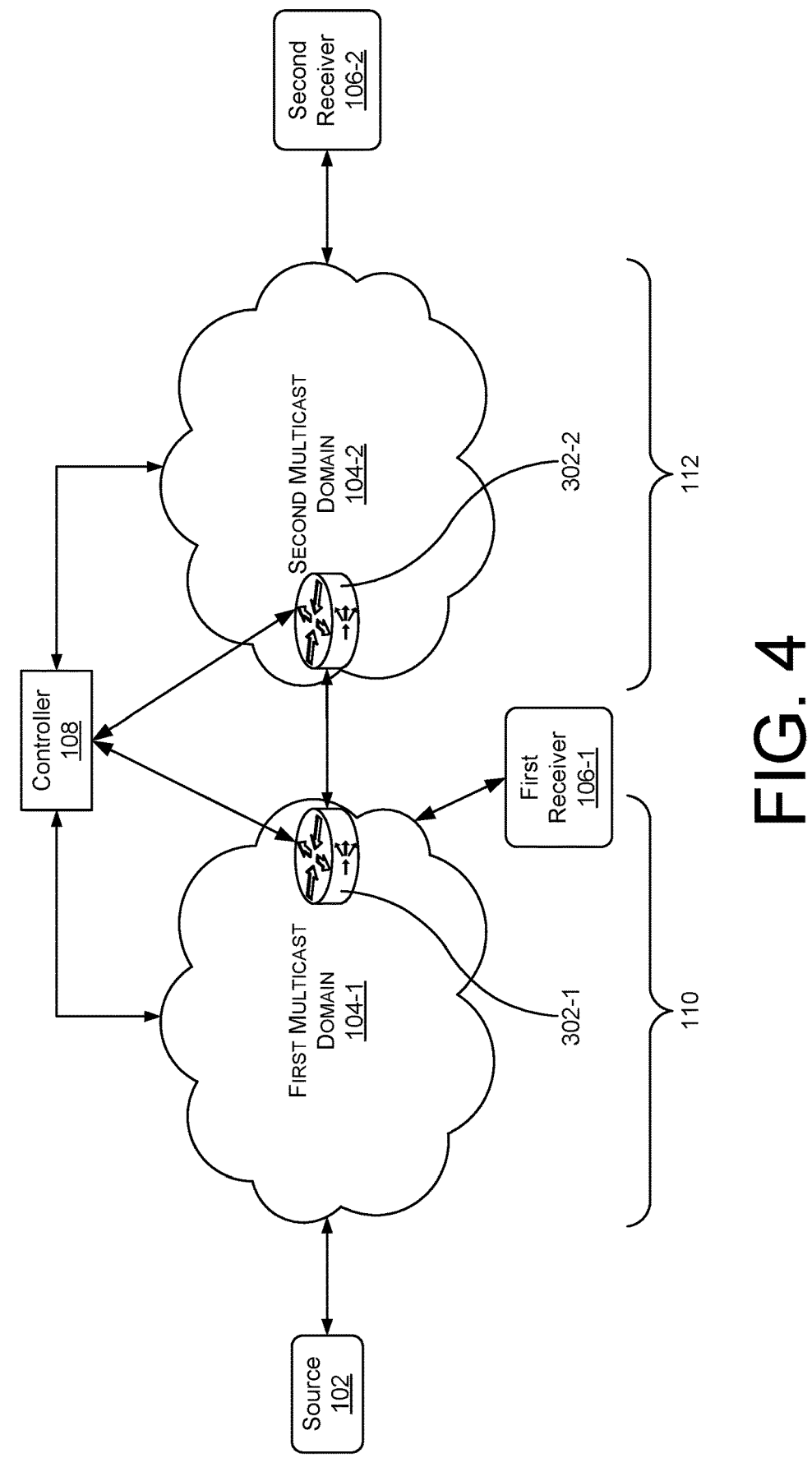
FIG. 4 illustrates the system-architecture diagram of the network of FIG. 1 including a first interdomain border node of a legacy network domain and a second interdomain border node of a tree segment identifier (Tree-SID) network domain, according to an example of the principles described herein.

FIG. 4 illustrates the system-architecture diagram of the network 100 of FIG. 1 including a first interdomain border node 302-1 of the first multicast domain 104-1 (e.g., a legacy network domain such as, for example, a PIM-DM-based, PIM-SM-based, or mLDP-based multicast network) and a second interdomain border node 302-2 of the second multicast domain 104-2 (e.g., a tree segment identifier (Tree-SID) network domain), according to an example of the principles described herein. In this example, the controller 108 may, in addition to the above examples of FIGS. 1 through 3, map identifiers present in the TreeSID network (e.g., the second multicast domain 104-2) with the (S,G) state information obtained from the nodes 202. Specifically, the controller 108 may map the (S,G) state information with, for example, a policy name, a segment identifier (SID) for the P2MP Tree (e.g., the Tree-SID), an address of a root node as mapped from the first multicast domain 104-1 (e.g., PIM-DM-, PIM-SM-, or mLDP-based multicast network), addresses of the leaf nodes of the first multicast domain 104-1, optimization objectives such as, for example, (traffic engineering (TE) objectives, interior gateway protocol (IGP) objectives, delay metric objectives, etc.), a number of constraints (e.g., affinity constraints), and active groups as mapped from the first multicast domain 104-1 (e.g., PIM-DM-, PIM-SM-, or mLDP-based multicast network). The controller 108 may ensure that the PIM-DM-, PIM-SM-, or mLDP-based tree of the first multicast domain 104-1 remains stitched to the Tree SID multicast stream at the interdomain border nodes 302-1, 302-2. Further, in the example of FIG. 4, the PIM may be enabled on the link between the interdomain border nodes 302-1, 302-2. More details regarding FIGS. 1 through 4 will now be provided in connection with the methods of FIGS. 5 through 7.

FIGS. 5 through 7 illustrate flow diagrams of example methods 500 through 700 and that illustrate aspects of the functions performed at least partly by the network 100, the controller 108, the source 102, the first interdomain border node 302-1 of the first multicast domain 104-1, the second interdomain border node 302-2 of the second multicast domain 104-2, the nodes 202, the second receiver 106-2, other devices described herein, and combinations thereof as described in FIGS. 1 through 4. The logical operations described herein with respect to FIGS. 5 through 7 may be implemented (1) as a sequence of computer-implemented acts or program modules running on a computing system and/or (2) as interconnected machine logic circuits or circuit modules within the computing system. In one example, the method(s) 500 through 700 may be performed by a system comprising one or more processors and one or more non-transitory computer-readable media storing computer-executable instructions that, when executed by the one or more processors, cause the one or more processors to perform the method(s) 500 through 700.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 5 through 7 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 5 illustrates a flow diagram of an example method 500 for interdomain multicast traffic transmission, according to an example of the principles described herein. The method 500 of FIG. 5 may include, at 502, extracting from a plurality of the nodes 202 of the first multicast domain 104-1 and the second multicast domain 104-2, source and group (S,G) state information. 202 may be performed with the controller 108 coupled to the first multicast domain 104-1 and the second multicast domain 104-2 where, as indicated above, the first multicast domain 104-1 and the second multicast domain 104-2 have incompatible multicast profiles. The extraction of the (S,G) state information may include the extraction of PIM information into a new enhanced BGP-LS/BGP address family. Existing BGP-LS does not carry multicast information. However, the controller 108 may create a new address family to transport this information via BGP-LS. In one example, the new address family may include a modification to the BGP-LS protocol that is modified to include a type, length, value (TLV) tuple. However, any new BGP-LS address family may be utilized in allowing for multicast information to be sent via the controller 108 and between the first interdomain border node 302-1 of the first multicast domain 104-1 and the second interdomain border node 302-2 of the second multicast domain 104-2.

At 504, the controller 108 may define a first interdomain border node 302-1 within the first multicast domain 104-1, and, at 506, the controller 108 may define a second interdomain border node 302-2 within the second multicast domain 104-2 as indicated and described herein in connection with FIG. 3. In one example, the interdomain border nodes 302-1, 302-2 may include any of the nodes 202 within the first multicast domain 104-1 and the second multicast domain 104-2, respectively. In one example, the interdomain border nodes 302-1, 302-2 may include a computing device such as, for example, a router, a switch, a server computer, a network appliance, or other computing device that may communicate between the first multicast domain 104-1 and the second multicast domain 104-2. In one example, the interdomain border nodes 302-1, 302-2 may include any dedicated device that may or may not be included as one of the nodes 202. In one example, the interdomain border nodes 302-1, 302-2 may be configured as a one-time effort or may be configured via a command line interface (CLI), graphical user interface (GUI), or other user-input device(s) or means. PIM may be enabled on the links between the first interdomain border node 302-1 of the first multicast domain 104-1 and the second interdomain border node 302-2 of the second multicast domain 104-2.

At 508, the controller 108 may transmit the (S,G) state information to the first interdomain border node 302-1 and the second interdomain border node 302-2. The transmission of the (S,G) state information to the multicast interdomain border nodes 302-1, 302-2 may significantly reduce overhead processing that may otherwise be performed by the controller 108. The controller 108 may include intelligence to transmit only new (S,G) state information when compared to a last time interval. In one example, the controller 108 may assign a timer or timeout value to the synchronization of the (S,G) state information or states thereof between the controller 108 and the interdomain border nodes 302-1, 302-2. In one example, a default the join/prune timeout value may be 210 seconds. The new timer (referred to herein as the (S,G) state information timer) assigned by the controller 108 may be defined to synchronize the (S,G) states may have a value that is less than the join/prune timer. PIM routers such as the nodes 202 and/or the interdomain border nodes 302-1, 302-2 may discover PIM neighbors and maintain PIM neighboring relationships with other routers by periodically sending hello messages. After receiving a hello message, a PIM router may wait a random period, which is smaller than the maximum delay between hello messages, before sending a hello message. This delay avoids collisions that occur when multiple PIM routers send hello messages simultaneously. The nodes 202 and/or the interdomain border nodes 302-1, 302-2 may periodically send join/prune messages upstream for state updates. A join/prune message contains the join/prune timeout timer. In one example, the controller 108 may set a join/prune timeout timer for each pruned downstream interface. Any node 202 and/or an interdomain border node 302-1, 302-2 that has lost assert election may prune its downstream interface and maintain the assert state for a period of time. When the assert state times out, the assert losers resume multicast forwarding. In one example, when a node 202 and/or an interdomain border node 302-1, 302-2 fails to receive subsequent multicast data from multicast source 102, the node 202 and/or an interdomain border node 302-1, 302-2 may not immediately delete the corresponding (S, G) entry, but may, instead, maintain the (S, G) entry for a period of time (the multicast source lifetime) before deleting the (S, G) entry.

In an example, where there are new (S,G) state information synchronized in a last interval in at least one of the interdomain border nodes 302-1, 302-2, the controller 108 may check incoming and outgoing interfaces of the nodes 202 for the new (S,G) state information. If an incoming/outgoing interface exists, no action may be required, multicast traffic may flow according to the existing multicast route entries in the multicast routing table maintained by the controller 108 and/or the interdomain border nodes 302-1, 302-2.

In an example where the incoming/outgoing interface does not exist for the new (S,G) state information synced from the controller 108, the nodes 202 and/or the interdomain border nodes 302-1, 302-2 may send a PIM join message towards the source and may send a PIM register message to a rendezvous point (RP) as mentioned above. The register message to the RP may be sent in an example, where the RP exists in at least one of the interdomain border nodes 302-1, 302-2. If there are any interested receivers downstream from the RP, a multicast tree (e.g., a rendezvous-point tree (RPT)) may be built according to the existing PIM implementation. Once a first packet hits a last hop router (LHR), traffic may be switched to a shortest path tree (SPT) if a shortest path to the source 102 exists based on the existing PIM implementation.

At 510, the first interdomain border node 302-1 and the second interdomain border node 302-2 may transmit multicast traffic between the first multicast domain 104-1 and the second multicast domain 104-2 via the first interdomain border node 302-1 and the second interdomain border node 302-2 based at least in part on the (S,G) state information obtained from the controller 108. In this manner, interworking between multicast domains that have different multicast profiles may be achieved.

FIG. 6 illustrates a flow diagram of an example method 600 for interdomain multicast traffic transmission, according to an example of the principles described herein. The method 600 of FIG. 6 may include, at 602, registering the plurality of nodes 202 of the first multicast domain 104-1 and the second multicast domain 104-2 with the controller 108. Registration of the nodes 202 may include any instance in which the nodes 202 receive multicast packets from the source 102. Registration may further include encapsulating the multicast packet into a PIM register messages and sending the encapsulated multicast packet as unicast packets to the RP (e.g., one of the nodes 202 within the first multicast domain 104-1 and/or the second multicast domain 104-2) in the case of a PIM-SM or flooded to the nodes 202 in the case of a PIM-DM. The RP or flooded node 202 may decapsulate the encapsulated multicast packet and transmit the original multicast packets down the shared tree as native multicast. If the RP or flooded node 202 receives a register message, the RP or flooded node 202 may transmit a PIM join message towards the source 102 of the multicast stream. The multicast stream may be routed natively, and the stream may be transmitted as Register messages. When the native multicast packet hits the RP or the flooded node 202, the RP or flooded node 202 may send a Register-Stop message back to the controller 108, and the controller 108 may stop sending the Register messages, leaving only the native multicast stream to flow.

At 604, the controller 108 may extract from a plurality of nodes 202 of the first multicast domain 104-1 and the second multicast domain 104-2, the source and group (S,G) state information. In one example, the nodes 202 may receive a GET command from the controller 108, and the nodes 202 may attempt to parse the argument according to this syntax to derive one or more (S,G) channel memberships. The (S,G) state information are the IP addresses or fully qualified domain names of the channels for which this argument is a subscription request. The nodes 202 may send the (S,G) state information to the controller 108.

Throughout the method 600, the controller 108 may transmit any new (S,G) state information to the first interdomain border node 302-1 and the second interdomain border node 302-2 as indicated at 606 but does so at least in a first instance. The controller 108 may include intelligence to transmit only new (S,G) state information when compared to a last time interval. This may significantly reduce the number of transmissions to the first interdomain border node 302-1 and the second interdomain border node 302-2. Thus, at 608, the first interdomain border node 302-1 and the second interdomain border node 302-2 may analyze any incoming and/or outgoing interfaces for the received (S,G) state information. At 610, the controller 108 and/or the first interdomain border node 302-1 and the second interdomain border node 302-2 may determine if any new (S,G) state information are included in the (S,G) state information. The controller 108 may utilize the new (S,G) state information timer described above and assigned by the controller 108 to synchronize the (S,G) states of the controller 108 and the first interdomain border node 302-1 and the second interdomain border node 302-2. As described above, (S,G) state information timer may have a value that is less than the join/prune timer in order to ensure that the states of the controller 108 and the first interdomain border node 302-1 and the second interdomain border node 302-2 are more frequently updated than the transmission of a join/prune message.

In response to a determination that no new (S,G) state information are included in the (S,G) state information (610, determination NO), then, at 612, the first interdomain border node 302-1 and the second interdomain border node 302-2 may transmit multicast traffic according to the existing entries between the first multicast domain 104-1 and the second multicast domain 104-2. Thus, based at least in part on no new (S,G) state information being included in the (S,G) state information, the multicast traffic may be transmitted between the first multicast domain and the second multicast domain based on an existing entry within the (S,G) state information.

In response, however, to a determination that new (S,G) state information are included in the (S,G) state information (610, determination YES), then, at 614, at least one of the first interdomain border node 302-1 and the second interdomain border node 302-2 may send a PIM join message to the source 102 and/or a PIM register message to the RP if an RP exists within the first multicast domain 104-1 and the second multicast domain 104-2 (e.g., the first multicast domain 104-1 or the second multicast domain 104-2 is s PIM-SM) or the controller 108. The PIM join message indicates to the source 102 that the particular node(s) 202 associated with the new (S,G) state information want to join the multicast tree and that the multicast traffic should be sent to the destination (e.g., the second receiver 106-2) based on the new (S,G) state information. The PIM register message sent to the RP may cause the particular node(s) 202 to be registered with the controller 108.

At 616, the controller 108 may build and end-to-end multicast tree based on the existing and new (S,G) state information received from the nodes 202. Thus, at 618, the source 102, and first interdomain border node 302-1 and the second interdomain border node 302-2 may transmit the multicast traffic from the first multicast domain 104-1 to the second multicast domain 104-2 based on the end-to-end multicast tree.

FIG. 7 illustrates a flow diagram of an example method 700 for interdomain multicast traffic transmission between a first interdomain border node 302-1 of a legacy network domain (e.g., the first multicast domain 104-1) and a second interdomain border node 302-2 of a Tree-SID network domain (e.g., the second multicast domain 104-2), according to an example of the principles described herein. As described above, the legacy network domain (e.g., the first multicast domain 104-1) in this example may include a PIM-DM-based, PIM-SM-based, or mLDP-based multicast network. Further, the Tree-SID-based multicast network (e.g., the second multicast domain 104-2) may include a controller 108 unlike the legacy network domain (e.g., the first multicast domain 104-1). In this scenario where interworking between the legacy network domain (e.g., the first multicast domain 104-1) and the Tree-SID-based multicast network (e.g., the second multicast domain 104-2) is contemplated, the method 700 may include, with the controller 108, enabling at least one proxy multicast source on at least one of the first interdomain border node 302-1 and the second interdomain border node 302-2 to stich between the first multicast domain 104-1 and the second multicast domain 104-2. In one example, the controller 108 may, enable, at 702, the at least one proxy multicast source on the second interdomain border node 302-2 to stich between the first multicast domain 104-1 and the second multicast domain 104-2.

The method 700 may further include, with the controller 108, extracting the (S,G) state information from the first multicast domain at 704. At 706, the controller 108 may push or otherwise transmit the (S,G) state information to at least one of the first interdomain border node 302-1 and the second interdomain border node 302-2. In one example, the controller 108 may push or otherwise transmit the (S,G) state information the second interdomain border node 302-2.

At 708, at least one of the first interdomain border node 302-1 and the second interdomain border node 302-2 may transmit a PIM join message to the source 102. In one example, the second interdomain border node 302-2 may transmit a PIM join message to the source 102 at 708.

At 710, the controller 108 may map the (S,G) state information obtained from the nodes 202 of at least one of the first multicast domain 104-1 and the second multicast domain 104-2 with a number of identities present in the Tree-SID network domain (e.g., the second multicast domain 104-2). For example, the mapped identities between the legacy network domain (e.g., the first multicast domain 104-1 such as, for example, a PIM-DM-based, PIM-SM-based, or mLDP-based multicast network) and the Tree-SID network domain (e.g., the second multicast domain 104-2) may include at least an address of a root node within the first multicast domain 104-1 and a number of active groups within the first multicast domain 104-1. In one example, the mapped identities may include a policy name, an SID for the P2MP Tree (e.g., the Tree-SID), the address of the root node as mapped from the legacy network domain (e.g., the first multicast domain 104-1 such as, for example, a PIM-DM-based, PIM-SM-based, or mLDP-based multicast network), the addresses of the leaf nodes within at least one of the first multicast domain 104-1 and the second multicast domain 104-2, a number of optimization objectives (e.g., TE, IGP, delay metrics, etc.), constraints (e.g., affinity), active groups as mapped from the legacy network domain (e.g., the first multicast domain 104-1 such as, for example, a PIM-DM-based, PIM-SM-based, or mLDP-based multicast network), other identifiers, and combinations thereof. Thus, in order to provide interworking between the first multicast domain 104-1 and the second multicast domain 104-2 in the example of FIG. 7, the legacy network domain (e.g., the first multicast domain 104-1 such as, for example, a PIM-DM-based, PIM-SM-based, or mLDP-based multicast network) should utilize the same parameters (e.g., identifiers) as those used by the Tree-SID network domain (e.g., the second multicast domain 104-2).

In one example, the controller 108 may not need to extract the policy name and/or the SID from the Tree-SID network domain (e.g., the second multicast domain 104-2), but may, instead, define the policy name on its own. In contrast, the address of the root node is not known by the Tree-SID network domain (e.g., the second multicast domain 104-2), and, therefore, the controller 108 may extract that information from the legacy network domain (e.g., the first multicast domain 104-1). As to the leaf nodes, the controller 108 may already know or have information defining these leaf nodes, and, therefore, may also not need to be extracted by the controller 108 from the legacy network domain (e.g., the first multicast domain 104-1). The optimization objectives and constraints may also not need to be extracted by the controller 108 from the legacy network domain (e.g., the first multicast domain 104-1 since this information is exclusive to the Tree-SID network domain (e.g., the second multicast domain 104-2). The active groups may include any designation of a number of groups of nodes 202 and/or interdomain border node 302 that are included within the same multicast distribution tree.

The controller 108 may, at 712, transmit the multicast traffic between the first multicast domain 104-1 and the second multicast domain 104-2 via the first interdomain border node 302-1 and the second interdomain border node 302-2 based at least in part on the mapped (S,G) state information. In the example of FIG. 7, the source 102 and/or the second receiver 106-2 may be placed in any domain for use cases such as, for example, CCTV camera networking, internet protocol television (IPTV), airport radio towers, and other similar user cases. This example, and other examples described herein, may be adopted as an intermediate-stage or as a temporary solution, or may be used a long-term or at least semi-permanent solution.

As outlined above, transition from a first multicast profile such as a legacy multicast domain located within a brownfield multicast domain 110 to a second domain such as a greenfield multicast domain 112 and achieving interworking between the two multicast domains may require significant effort where no seamless mechanism is available. The present systems and methods described herein including the above examples, may provide for this seamless interworking between multicast domains running different multicast profiles and may prove beneficial in situations where two organizations which are owners of the incompatible multicast domains are seeking to merge or move the lates multicast profile to provide new service demands.

Figure 8:
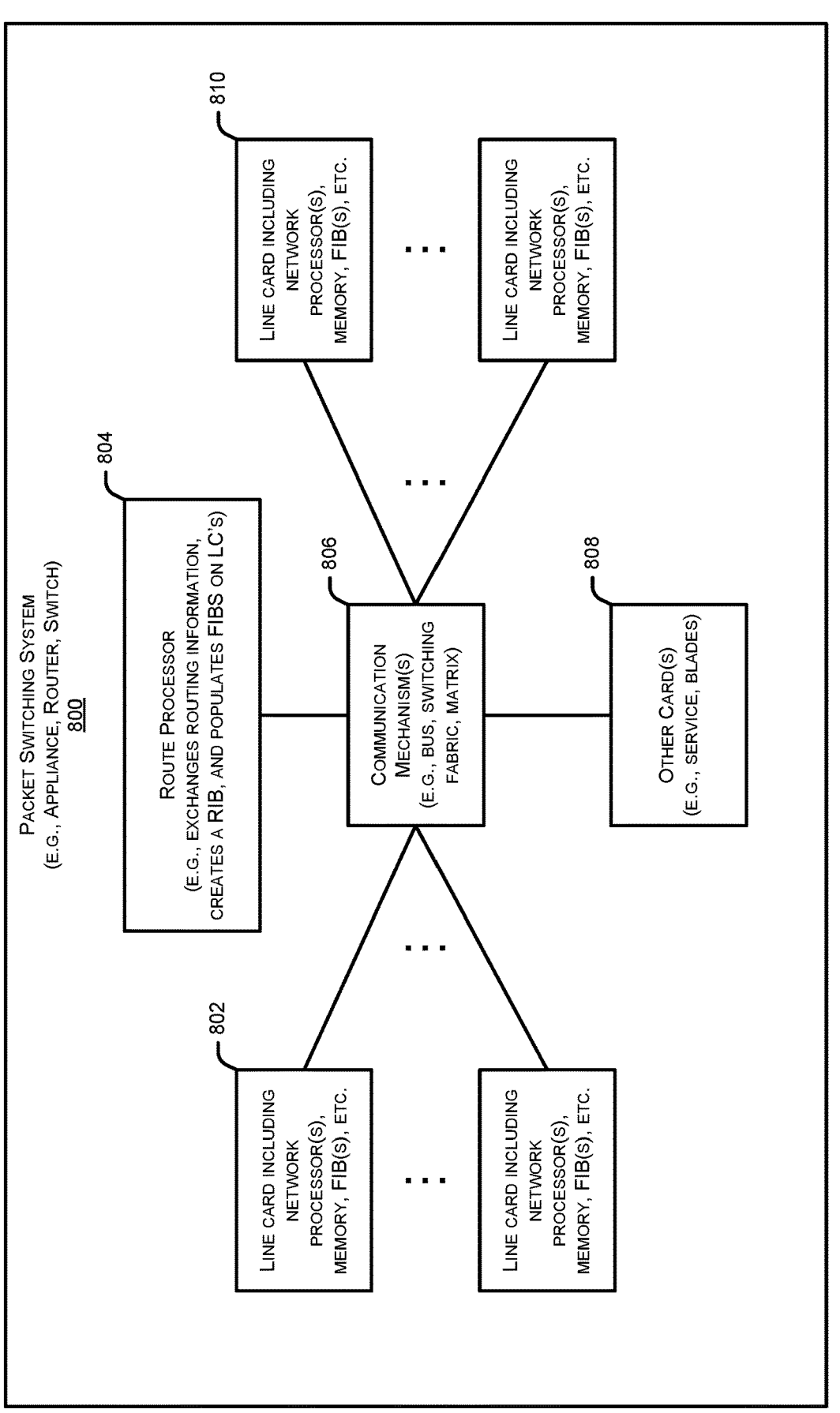
FIG. 8 illustrates a block diagram illustrating an example packet switching system that can be utilized to implement various aspects of the technologies disclosed herein.

FIG. 8 illustrates a block diagram illustrating an example packet switching device (or system) 800 that can be utilized to implement various aspects of the technologies disclosed herein. In one example, packet switching device(s) 800 may be employed in various networks, such as, for example, network 100 as described with respect to FIGS. 1 through 4.

In one example, a packet switching device 800 may comprise multiple line card(s) 802, 810, each with one or more network interfaces for sending and receiving packets over communications links (e.g., possibly part of a link aggregation group). The packet switching device 800 may also have a control plane with one or more processing elements 804 for managing the control plane and/or control plane processing of packets associated with forwarding of packets in a network. The packet switching device 800 may also include other cards 808 (e.g., service cards, blades) which include processing elements that are used to process (e.g., forward/send, drop, manipulate, change, modify, receive, create, duplicate, apply a service) packets associated with forwarding of packets in a network. The packet switching device 800 may comprise hardware-based communication mechanism 806 (e.g., bus, switching fabric, and/or matrix, etc.) for allowing its different entities 802, 804, 808 and 810 to communicate. Line card(s) 802, 810 may typically perform the actions of being both an ingress and/or an egress line card 802, 810, in regard to multiple other particular packets and/or packet streams being received by, or sent from, packet switching device 800.

Figure 9:
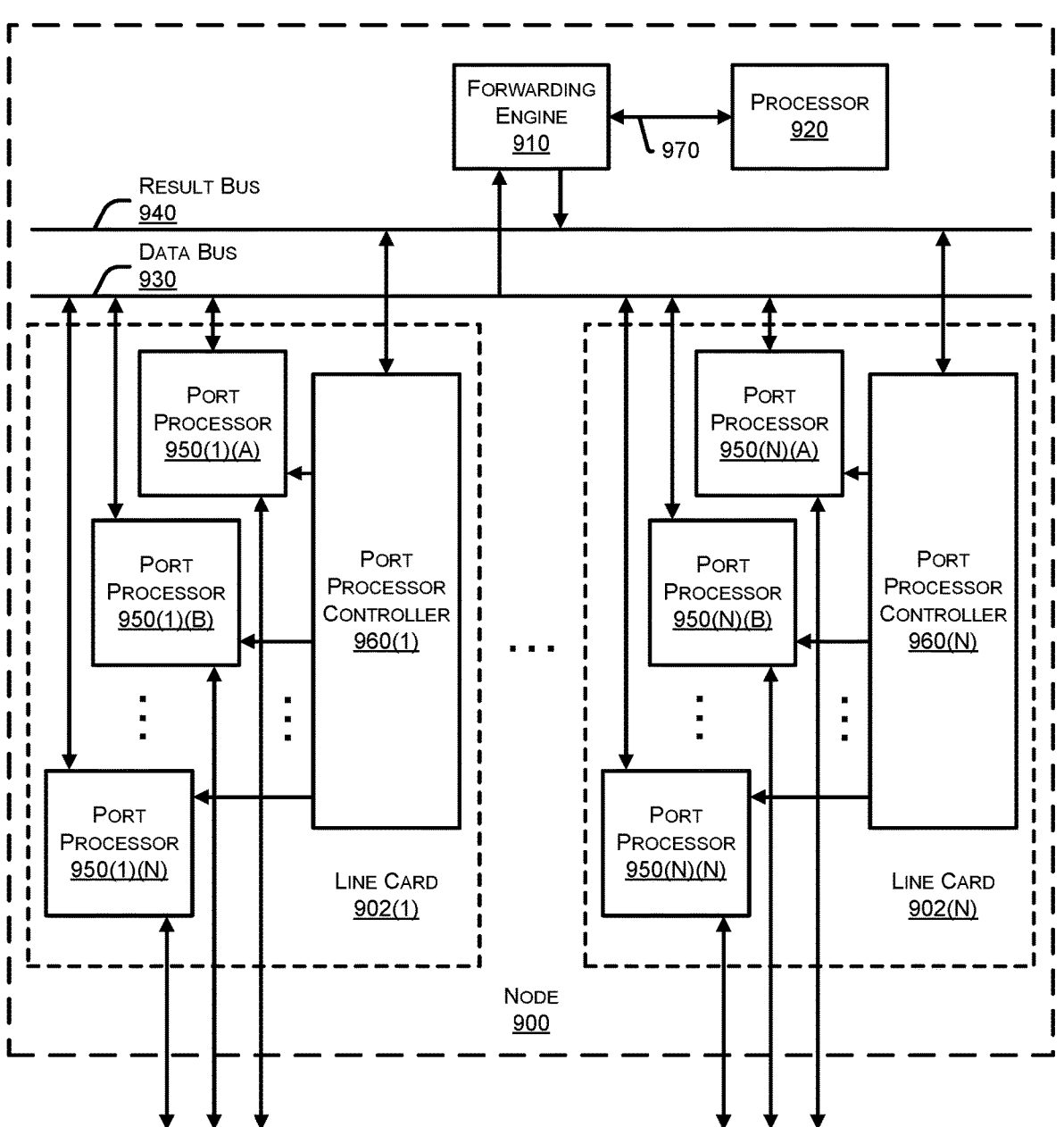
FIG. 9 illustrates a block diagram illustrating certain components of an example node that can be utilized to implement various aspects of the technologies disclosed herein.

FIG. 9 illustrates a block diagram illustrating certain components of an example node 900 that can be utilized to implement various aspects of the technologies disclosed herein. In one example, node(s) 900 may be employed in various networks, such as, for example, network 100 as described with respect to FIGS. 1 through 4.

In one example, node 900 may include any number of line cards 902 (e.g., line cards 902(1)-(N), where N may be any integer greater than 1) that are communicatively coupled to a forwarding engine 910 (also referred to as a packet forwarder) and/or a processor 920 via a data bus 930 and/or a result bus 940. Line cards 802(1)-(N) may include any number of port processors 950(1)(A)-(N) (N) which are controlled by port processor controllers 960(1)-(N), where N may be any integer greater than 1. Additionally, or alternatively, forwarding engine 910 and/or processor 920 are not only coupled to one another via the data bus 930 and the result bus 940, but may also communicatively coupled to one another by a communications link 970.

The processors (e.g., the port processor(s) 950 and/or the port processor controller(s) 960) of each line card 902 may be mounted on a single printed circuit board. When a packet or packet and header are received, the packet or packet and header may be identified and analyzed by node 900 (also referred to herein as a router) in the following manner. Upon receipt, a packet (or some or all of its control information) or packet and header may be sent from one of port processor(s) 950(1)(A)-(N) (N) at which the packet or packet and header was received and to one or more of those devices coupled to the data bus 930 (e.g., others of the port processor(s) 950(1)(A)-(N) (N), the forwarding engine 910 and/or the processor 920). Handling of the packet or packet and header may be determined, for example, by the forwarding engine 910. For example, the forwarding engine 910 may determine that the packet or packet and header should be forwarded to one or more of port processors 950(1)(A)-(N) (N). This may be accomplished by indicating to corresponding one(s) of port processor controllers 960 (1)-(N) that the copy of the packet or packet and header held in the given one(s) of port processor(s) 950(1)(A)-(N) (N) should be forwarded to the appropriate one of port processor(s) 950(1)(A)-(N) (N). Additionally, or alternatively, once a packet or packet and header has been identified for processing, the forwarding engine 910, the processor 920, and/or the like may be used to process the packet or packet and header in some manner and/or maty add packet security information in order to secure the packet. On a node 900 sourcing such a packet or packet and header, this processing may include, for example, encryption of some or all of the packet's or packet and header's information, the addition of a digital signature, and/or some other information and/or processing capable of securing the packet or packet and header. On a node 900 receiving such a processed packet or packet and header, the corresponding process may be performed to recover or validate the packet's or packet and header's information that has been secured.

Figure 10:
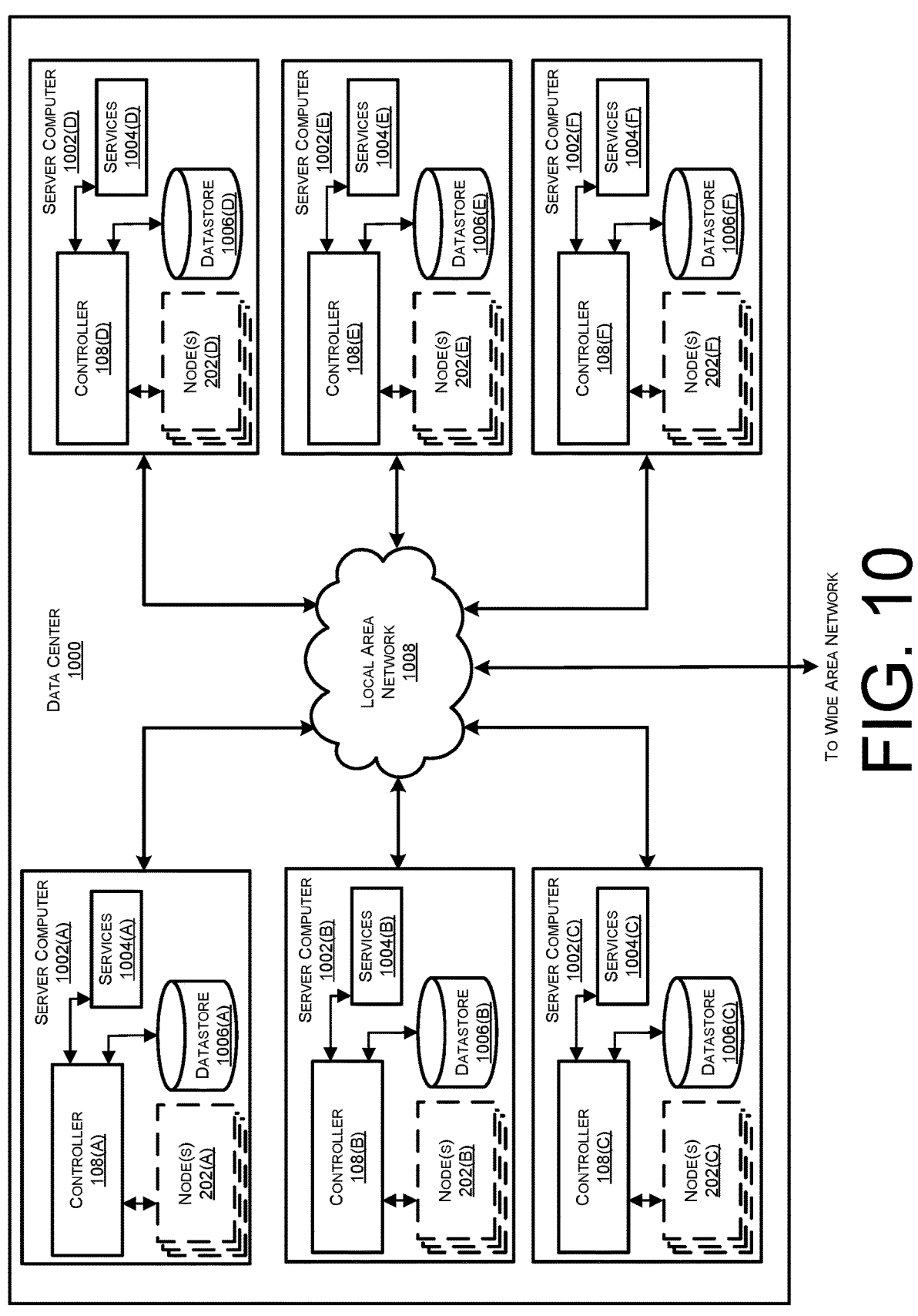
FIG. 10 illustrates a computing system diagram illustrating a configuration for a data center that can be utilized to implement aspects of the technologies disclosed herein.

FIG. 10 is a computing system diagram illustrating a configuration for a data center 1000 that can be utilized to implement aspects of the technologies disclosed herein. The example data center 1000 shown in FIG. 10 includes several server computers 1002A-1002E (which might be referred to herein singularly as "a server computer 1002" or in the plural as "the server computers 1002") for providing computing resources. In one example, the server computers 1002 may include, or correspond to, the servers associated with the network 100, the packet switching system 800, and/or the node 900 described herein with respect to FIGS. 1, 8 and 9, respectively.

The server computers 1002 can be standard tower, rack-mount, or blade server computers configured appropriately for providing the computing resources described herein. As mentioned above, the computing resources provided by the network 100 can be data processing resources such as VM instances or hardware computing systems, database clusters, computing clusters, storage clusters, data storage resources, database resources, networking resources, and others. Some of the servers 1002 can also be configured to execute a resource manager capable of instantiating and/or managing the computing resources. In the case of VM instances, for example, the resource manager can be a hypervisor or another type of program configured to enable the execution of multiple VM instances on a single server computer 1002. Server computers 1002 in the data center 1000 can also be configured to provide network services and other types of services.

In the example data center 1000 shown in FIG. 10, an appropriate LAN 1008 is also utilized to interconnect the server computers 1002A-1002E. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 1000, between each of the server computers 1002A-1002E in each data center 1000, and, potentially, between computing resources in each of the server computers 1002. It should be appreciated that the configuration of the data center 1000 described with reference to FIG. 10 is merely illustrative and that other implementations can be utilized.

In one example, the server computers 1002 may each execute a controller 108, one or more node(s) 202 (including at least one interdomain border node 302), one or more datastore(s) 1006, and/or one or more services 1004. The one or more datastore(s) 1006 may be used by the network 100 to store the (S,G) state information obtained from the node(s) 202. Further, the one or more datastore(s) 1006 may be used by the network 100 to store any mapped identities between the legacy network domain (e.g., the first multicast domain 104-1 such as, for example, a PIM-DM-based, PIM-SM-based, or mLDP-based multicast network) and the Tree-SID network domain (e.g., the second multicast domain 104-2) including, for example, the policy name, the SID for the P2MP Tree (e.g., the Tree-SID), the address of the root node as mapped from the legacy network domain, the addresses of the leaf nodes within at least one of the first multicast domain 104-1 and the second multicast domain 104-2, the number of optimization objectives (e.g., TE, IGP, delay metrics, etc.), the constraints (e.g., affinity), the active groups as mapped from the legacy network domain, other identifiers, and combinations thereof.

The services 1004 may include any functions performed by the network 100 or the controller 108. For example, the services 1004 may include the multicast domain 104 inter-working processes and methods described herein including the extraction of the (S,G) state information and the mapped identities, and use of the (S,G) state information and the mapped identities to provide for the transmission of multicast traffic from the first multicast domain 104-1 and the second multicast domain 104-2.

In some instances, like application containers, VM instances, and storage, on a permanent or an as-needed basis. Among other types of functionality, the computing resources provided by the network 100 may be utilized to implement the various services described above. The computing resources provided by the network 100 can include various types of computing resources, such as data processing resources like application containers and VM instances, data storage resources, networking resources, data communication resources, network services, and the like.

Each type of computing resource provided by the network 100 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The network 100 can also be configured to provide other types of computing resources not mentioned specifically herein.

The computing resources provided by the network 100 may be enabled in one embodiment by one or more data centers 1000 (which might be referred to herein singularly as "a data center 1000" or in the plural as "the data centers 1000"). The data centers 1000 are facilities utilized to house and operate computer systems and associated components. The data centers 1000 typically include redundant and backup power, communications, cooling, and security systems. The data centers 1000 can also be located in geographically disparate locations. One illustrative embodiment for a data center 1000 that can be utilized to implement the technologies disclosed herein will be described below with regard to FIG. 11.

Figure 11:
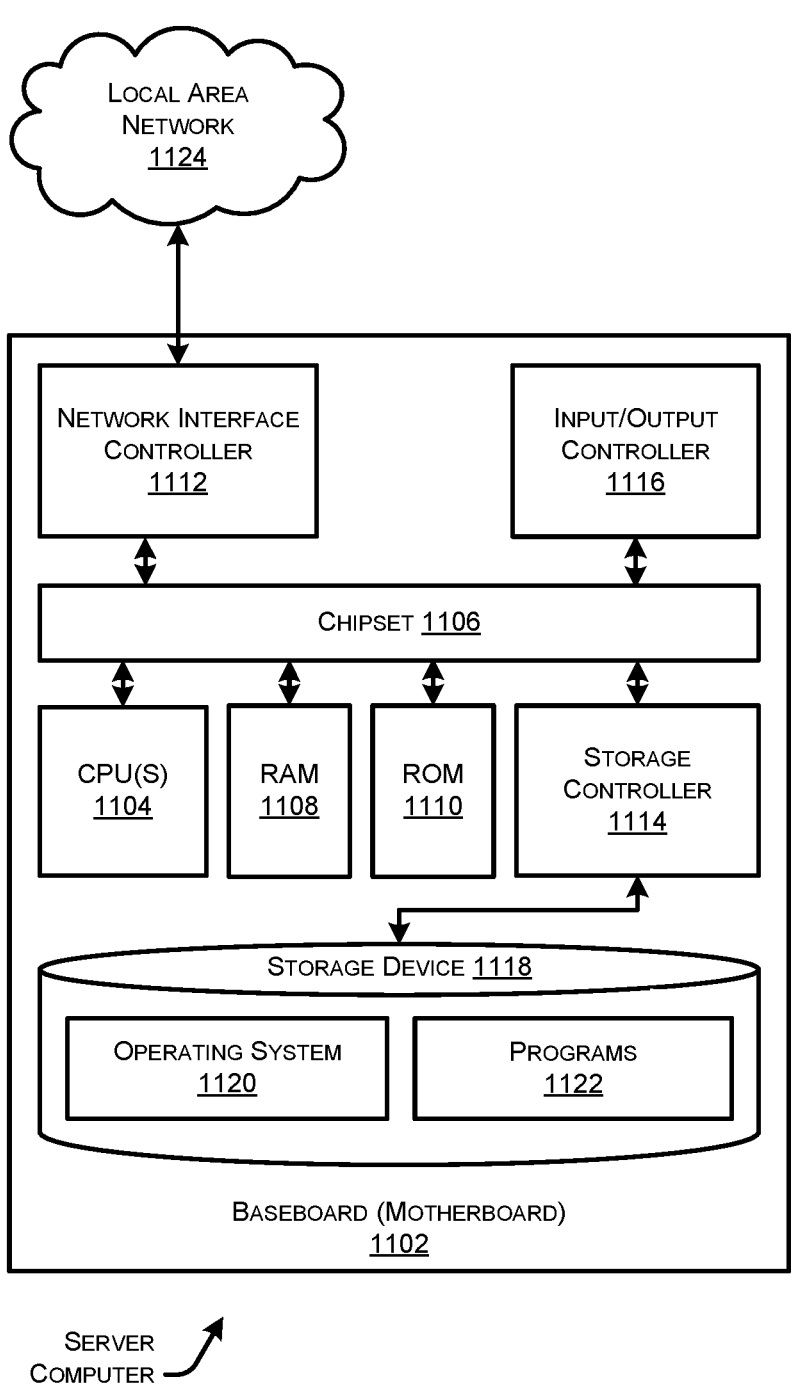
FIG. 11 is a computer architecture diagram showing an illustrative computer hardware architecture for implementing a server device that can be utilized to implement aspects of the various technologies presented herein.

FIG. 11 shows an example computer architecture for a computing device (or network routing device) 1002 capable of executing program components for implementing the functionality described above. The computer architecture shown in FIG. 11 illustrates a conventional server computer, workstation, desktop computer, laptop, tablet, network appliance, e-reader, smartphone, or other computing device, and can be utilized to execute any of the software components presented herein. The computing device 1002 may, in one example, correspond to a physical server 1002 of a data center 1000, the packet switching system 800, and/or the node 900 described herein with respect to FIGS. 1, 8, 9 and 10, respectively.

The computing device 1002 includes a baseboard 1102, or "motherboard," which is a printed circuit board to which a multitude of components or devices can be connected by way of a system bus or other electrical communication paths. In one illustrative configuration, one or more central processing units ("CPUs") 1104 operate in conjunction with a chipset 1106. The CPUs 1104 can be standard programmable processors that perform arithmetic and logical operations necessary for the operation of the computing device 1002.

The CPUs 1104 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1106 provides an interface between the CPUs 1104 and the remainder of the components and devices on the baseboard 1102. The chipset 1106 can provide an interface to a RAM 1108, used as the main memory in the computing device 1002. The chipset 1106 can further provide an interface to a computer-readable storage medium such as a read-only memory ("ROM") 1110 or non-volatile RAM ("NVRAM") for storing basic routines that help to startup the computing device 1002 and to transfer information between the various components and devices. The ROM 1110 or NVRAM can also store other software components necessary for the operation of the computing device 1002 in accordance with the configurations described herein.

The computing device 1002 can operate in a networked environment using logical connections to remote computing devices and computer systems through a network, such as the network 1124 (or 1008). The chipset 1106 can include functionality for providing network connectivity through a NIC 1112, such as a gigabit Ethernet adapter. The NIC 1112 is capable of connecting the computing device 1002 to other computing devices over the network 1124. It should be appreciated that multiple NICs 1112 can be present in the computing device 1002, connecting the computer to other types of networks and remote computer systems.

The computing device 1002 can be connected to a storage device 1118 that provides non-volatile storage for the computing device 1002. The storage device 1118 can store an operating system 1120, programs 1122, and data, which have been described in greater detail herein. The storage device 1118 can be connected to the computing device 1002 through a storage controller 1114 connected to the chipset 1106. The storage device 1118 can consist of one or more physical storage units. The storage controller 1114 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 1002 can store data on the storage device 1118 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 1118 is characterized as primary or secondary storage, and the like.

For example, the computing device 1002 can store information to the storage device 1118 by issuing instructions through the storage controller 1114 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1002 can further read information from the storage device 1118 by detecting the physical states or characteristics of one or more particular locations within the physical storage units.

In addition to the mass storage device 1118 described above, the computing device 1002 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 1002. In one example, the operations performed by the network 100, and or any components included therein, may be supported by one or more devices similar to computing device 1002. Stated otherwise, some or all of the operations performed by the network 100, and or any components included therein, may be performed by one or more computing device 1002 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 1118 can store an operating system 1120 utilized to control the operation of the computing device 1002. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 1118 can store other system or application programs and data utilized by the computing device 1002.

In one embodiment, the storage device 1118 or other computer-readable storage media is encoded with computer-executable instructions which, when loaded into the computing device 1002, transform the computer from a general-purpose computing system into a special-purpose computer capable of implementing the embodiments described herein. These computer-executable instructions transform the computing device 1002 by specifying how the CPUs 1104 transition between states, as described above. According to one embodiment, the computing device 1002 has access to computer-readable storage media storing computer-executable instructions which, when executed by the computing device 1002, perform the various processes described above with regard to FIGS. 1 through 7. The computing device 1002 can also include computer-readable storage media having instructions stored thereupon for performing any of the other computer-implemented operations described herein.

The computing device 1002 can also include one or more input/output controllers 1116 for receiving and processing input from a number of input devices, such as a keyboard, a mouse, a touchpad, a touch screen, an electronic stylus, or other type of input device. Similarly, an input/output controller 1116 can provide output to a display, such as a computer monitor, a flat-panel display, a digital projector, a printer, or other type of output device. It will be appreciated that the computing device 1002 might not include all of the components shown in FIG. 11, can include other components that are not explicitly shown in FIG. 11, or might utilize an architecture completely different than that shown in FIG. 11.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

Conclusion

The examples described herein provide a system, method and non-transitory computer-readable medium storing instructions that, when executed, causes a processor to perform operations including, with a controller coupled to a first multicast domain and a second multicast domain having incompatible multicast profiles, extracting from a plurality of nodes of the first multicast domain and the second multicast domain, source and group (S,G) state information. A first interdomain border node may be within the first multicast domain. A second interdomain border node may be defined within the second multicast domain. The (S,G) state information may be transmitted to the first interdomain border node and the second interdomain border node. The multicast traffic may be transmitted between the first multicast domain and the second multicast domain via the first interdomain border node and the second interdomain border node based at least in part on the (S,G) state information.

Transition from one multicast domain to another with differing profile and interworking between the two multicast domains has been tedious effort. The above-described systems and methods, create interworking within different protocol islands of multicast domains and allow for less complex network designs, eliminate isolated multicast islands, and provide seamless interworking between multicast domains running different profiles or protocols to meet additional and/or new service demands.

While the present systems and methods are described with respect to the specific examples, it is to be understood that the scope of the present systems and methods are not limited to these specific examples. Since other modifications and changes varied to fit particular operating requirements and environments will be apparent to those skilled in the art, the present systems and methods are not considered limited to the example chosen for purposes of disclosure and covers all changes and modifications which do not constitute departures from the true spirit and scope of the present systems and methods.

Although the application describes examples having specific structural features and/or methodological acts, it is to be understood that the claims are not necessarily limited to the specific features or acts described. Rather, the specific features and acts are merely illustrative of some examples that fall within the scope of the claims of the application.

What is claimed is:

1. A non-transitory computer-readable medium storing instructions that, when executed, causes a processor to perform operations, comprising:

with a controller coupled to a first multicast domain and a second multicast domain having incompatible multicast profiles:

extracting from a plurality of nodes of the first multicast domain and the second multicast domain, source and group (S,G) state information;

defining a first interdomain border node within the first multicast domain;

defining a second interdomain border node within the second multicast domain;

transmitting the (S,G) state information to the first interdomain border node and the second interdomain border node; and transmitting multicast traffic between the first multicast domain and the second multicast domain via the first interdomain border node and the second interdomain border node based at least in part on the (S,G) state information, wherein the (S,G) state information is extracted from the plurality of nodes via an interdomain address family for communication between the first multicast domain and the second multicast domain, the interdomain address family being based at least in part on a modified border gateway protocol link state (BGP-LS) protocol.

2. The non-transitory computer-readable medium of claim 1, the operations further comprising registering the plurality of nodes of the first multicast domain and the second multicast domain with the controller.

3. The non-transitory computer-readable medium of claim 1, wherein the modified BGP-LS protocol is modified by inclusion of a type, length, value (TLV) tuple.

4. The non-transitory computer-readable medium of claim 1, wherein transmitting the (S,G) state information to the first interdomain border node and the second interdomain border node comprises:

analyzing incoming and outgoing interfaces for the (S,G) state information;

determining if any new (S,G) state information are included in the (S,G) state information;

based at least in part on the new (S,G) state information being included in the (S,G) state information:

transmitting, by the second interdomain border node, a protocol-independent multicast (PIM) join message to a source within the first multicast domain;

based at least in part on a rendezvous point (RP) existing within the second multicast domain, transmitting, by the second interdomain border node, a PIM register message to the RP in the second multicast domain from the second interdomain border node;

building and end-to-end multicast tree based on the (S,G) state information and new (S,G) state information; and transmitting the multicast traffic between the first multicast domain and the second multicast domain via the first interdomain border node and the second interdomain border node based at least in part on the end-to-end multicast tree.

5. The non-transitory computer-readable medium of claim 4, the operations further comprising, based at least in part on no new (S,G) state information being included in the (S,G) state information, transmitting the multicast traffic between the first multicast domain and the second multicast domain based on an existing entry within the (S,G) state information.

6. The non-transitory computer-readable medium of claim 4, wherein transmitting the (S,G) state information to the first interdomain border node and the second interdomain border node is performed at a time interval.

7. The non-transitory computer-readable medium of claim 6, wherein a value of the time interval comprises:

a default join/prune timeout value of 210 seconds, or a new value defined to synchronize (S,G) states between the controller and the first interdomain border node and the second interdomain border node, the new value being less than the default join/prune timeout value.

8. The non-transitory computer-readable medium of claim 1, wherein defining the first interdomain border node and defining the second interdomain border node is performed in a single instance via an interface.

9. The non-transitory computer-readable medium of claim 1, wherein the controller forms part of a tree segment identifier (tree-SID)-based multicast domain, wherein controller further performs the operations comprising:

enabling at least one proxy multicast source on at least one of the first interdomain border node or the second interdomain border node to stich between the first multicast domain and the second multicast domain;

extracting the (S,G) state information from the first multicast domain;

pushing the (S,G) state information to the second interdomain border node within the second multicast domain;

transmitting a PIM join message to a source;

mapping the (S,G) state information from the first multicast domain including at least an address of a root node within the first multicast domain and active groups within the first multicast domain; and transmitting the multicast traffic between the first multicast domain and the second multicast domain via the first interdomain border node and the second interdomain border node based at least in part on the (S,G) state information.

10. A system comprising:

a processor; and a non-transitory computer-readable media storing instructions that, when executed by the processor, causes the processor to perform operations comprising:

with a controller coupled to a first multicast domain and a second multicast domain having incompatible multicast profiles:

extracting from a plurality of nodes of the first multicast domain and the second multicast domain, source and group (S,G) state information;

defining a first interdomain border node within the first multicast domain;

defining a second interdomain border node within the second multicast domain;

transmitting the (S,G) state information to the first interdomain border node and the second interdomain border node;

transmitting multicast traffic between the first multicast domain and the second multicast domain via the first interdomain border node and the second interdomain border node based at least in part on the (S,G) state information, wherein the controller forms part of a tree segment identifier (tree-SID)-based multicast domain, wherein the controller further performs the operations comprising:

enabling at least one proxy multicast source on the second interdomain border node to stich between the first multicast domain and the second multicast domain;

extracting the (S,G) state information from the first multicast domain;

pushing the (S,G) state information to the second interdomain border node within the second multicast domain;

transmitting a PIM join message to a source;

mapping the (S,G) state information from the first multicast domain including at least an address of a root node within the first multicast domain and active groups within the first multicast domain; and transmitting the multicast traffic between the first multicast domain and the second multicast domain via the first interdomain border node and the second interdomain border node based at least in part on the (S,G) state information.

11. The system of claim 10, wherein the (S,G) state information is extracted from the plurality of nodes via an interdomain address family for communication between the first multicast domain and the second multicast domain, the interdomain address family being based at least in part on a modified border gateway protocol link state (BGP-LS) protocol modified by inclusion of a type, length, value (TLV) tuple.

12. The system of claim 11, wherein transmitting the (S,G) state information to the first interdomain border node and the second interdomain border node comprises:

analyzing incoming and outgoing interfaces for the (S,G) state information;

determining if any new (S,G) state information are included in the (S,G) state information;

based at least in part on the new (S,G) state information being included in the (S,G) state information:

transmitting, by the second interdomain border node, a protocol-independent multicast (PIM) join message to a source within the first multicast domain;

based at least in part on a rendezvous point (RP) existing within the second multicast domain, transmitting, by the second interdomain border node, a PIM register message to the RP in the second multicast domain from the second interdomain border node;

building and end-to-end multicast tree based on the (S,G) state information and new (S,G) state information; and transmitting the multicast traffic between the first multicast domain and the second multicast domain via the first interdomain border node and the second interdomain border node based at least in part on the end-to-end multicast tree.

13. A method of interdomain multicast traffic transmission, comprising, with a controller coupled to a first multicast domain and a second multicast domain having incompatible multicast profiles:

extracting from a plurality of nodes of the first multicast domain and the second multicast domain, source and group (S,G) state information;

defining a first interdomain border node within the first multicast domain;

defining a second interdomain border node within the second multicast domain;

transmitting the (S,G) state information to the first interdomain border node and the second interdomain border node; and transmitting multicast traffic between the first multicast domain and the second multicast domain via the first interdomain border node and the second interdomain border node based at least in part on the (S,G) state information, wherein the (S,G) state information is extracted from the plurality of nodes via an interdomain address family for communication between the first multicast domain and the second multicast domain, the interdomain address family being based at least in part on a modified border gateway protocol link state (BGP-LS) protocol.

14. The method of claim 13, further comprising registering the plurality of nodes of the first multicast domain and the second multicast domain with the controller.

15. The method of claim 13, wherein transmitting the (S,G) state information to the first interdomain border node and the second interdomain border node comprises:

analyzing incoming and outgoing interfaces for the (S,G) state information;

determining if any new (S,G) state information are included in the (S,G) state information;

based at least in part on the new (S,G) state information being included in the (S,G) state information:

transmitting, by the second interdomain border node, a protocol-independent multicast (PIM) join message to a source within the first multicast domain;

based at least in part on a rendezvous point (RP) existing within the second multicast domain, transmitting, by the second interdomain border node, a PIM register message to the RP in the second multicast domain from the second interdomain border node;

building and end-to-end multicast tree based on the (S,G) state information and new (S,G) state information; and transmitting the multicast traffic between the first multicast domain and the second multicast domain via the first interdomain border node and the second interdomain border node based at least in part on the end-to-end multicast tree, based at least in part on no new (S,G) state information being included in the (S,G) state information, transmitting the multicast traffic between the first multicast domain and the second multicast domain based on an existing entry within the (S,G) state information.

16. The method of claim 15, wherein transmitting the (S,G) state information to the first interdomain border node and the second interdomain border node is performed at a time interval, wherein a value of the time interval comprises:

a default join/prune timeout value of 210 seconds, or a new value defined to synchronize (S,G) states between the controller and the first interdomain border node and the second interdomain border node, the new value being less than the default join/prune timeout value.

17. The method of claim 13, wherein the controller forms part of a tree segment identifier (tree-SID)-based multicast domain, the method further comprising:

enabling at least one proxy multicast source on the second interdomain border node to stich between the first multicast domain and the second multicast domain;

extracting the (S,G) state information from the first multicast domain;

pushing the (S,G) state information to the second interdomain border node within the second multicast domain;

transmitting a PIM join message to a source;

mapping the (S,G) state information from the first multicast domain including at least an address of a root node within the first multicast domain and active groups within the first multicast domain; and transmitting the multicast traffic between the first multicast domain and the second multicast domain via the first interdomain border node and the second interdomain border node based at least in part on the (S,G) state information.

*    *    *    *    *